US012717609B2

(12) United States Patent
Grinshpun et al.

(10) Patent No.: US 12,717,609 B2
(45) Date of Patent: Aug. 25, 2026

(54) ENFORCEMENT OF END-TO-END TRANSACTION LATENCY

(71) Applicant: Nokia Technologies Oy, Espoo (FI)

(72) Inventors: Edward Grinshpun, Freehold, NJ (US); Bilgehan Erman, Weehawken, NJ (US); Catello Di Martino, Uberlandia (BR)

(73) Assignee: NOKIA TECHNOLOGIES OY, Espoo (FI)

( * ) Notice: Subject to any disclaimer, the term of this patent is extended or adjusted under 35 U.S.C. 154(b) by 414 days.

(21) Appl. No.: 18/395,811

(22) Filed: Dec. 26, 2023

(65) Prior Publication Data

US 2025/0208901 A1 Jun. 26, 2025

(51) Int. Cl.
*G06F 9/46* (2006.01)

(52) U.S. Cl.
CPC .................................... *G06F 9/467* (2013.01)

(58) Field of Classification Search
CPC ....... G06F 9/467; H04L 47/56; H04L 47/564; H04L 47/28
See application file for complete search history.

(56) References Cited

U.S. PATENT DOCUMENTS

2008/0159337 A1 7/2008 Lee
2011/0019668 A1* 1/2011 Diab ..................... H04L 47/564 370/389
2018/0131614 A1* 5/2018 Song ..................... H04L 47/283

FOREIGN PATENT DOCUMENTS

WO 2020191014 A1 9/2020

OTHER PUBLICATIONS

Extended European Search Report in corresponding EP Application No. 24220418.8-1206, dated Apr. 17, 2025, 17 pages.
A. Sivaraman, S. Subramanian, M. Alizadeh, S. Chole, S.-T. Chuang, A. Agrawal, H. Balakrishnan, T. Edsall, S. Katti, and N. Mckeown, "Programmable Packet Scheduling at Line Rate," In Proceedings of the 2016 ACM SIGCOMM Conference (SIGCOMM '16); pp. (14). <https://doi.org/10.1145/2934872.2934899>.
3rd Generation Partnership Project; Technical Specification Group Services and System Aspects; Study on Communication for Automation in Vertical Domains (Release 16); 3GPP TR 22.804, V16. 3.0, Jul. 2020, pp. (41).

* cited by examiner

*Primary Examiner* — Dong U Kim
(74) *Attorney, Agent, or Firm* — ALSTON & BIRD LLP

(57) ABSTRACT

Various example embodiments for supporting enforcement of end-to-end transaction latency for transaction-based applications and services are presented herein. The enforcement of a total end-to-end transaction latency for a transaction of a transaction-based application or service may be supported by associating a transaction latency budget with the transaction data of the transaction and updating the transaction latency budget during execution of the transaction to ensure that the transaction is completed within the total end-to-end transaction latency permitted for the transaction-based application or service. The enforcement of end-to-end transaction latency for transaction-based applications and services may be configured to enforce end-to-end transaction latency without the need for use of network-wide time synchronization (rather, all of the timing may be measured locally using local clocks of the elements in the end-to-end path of the application or service transaction).

17 Claims, 10 Drawing Sheets

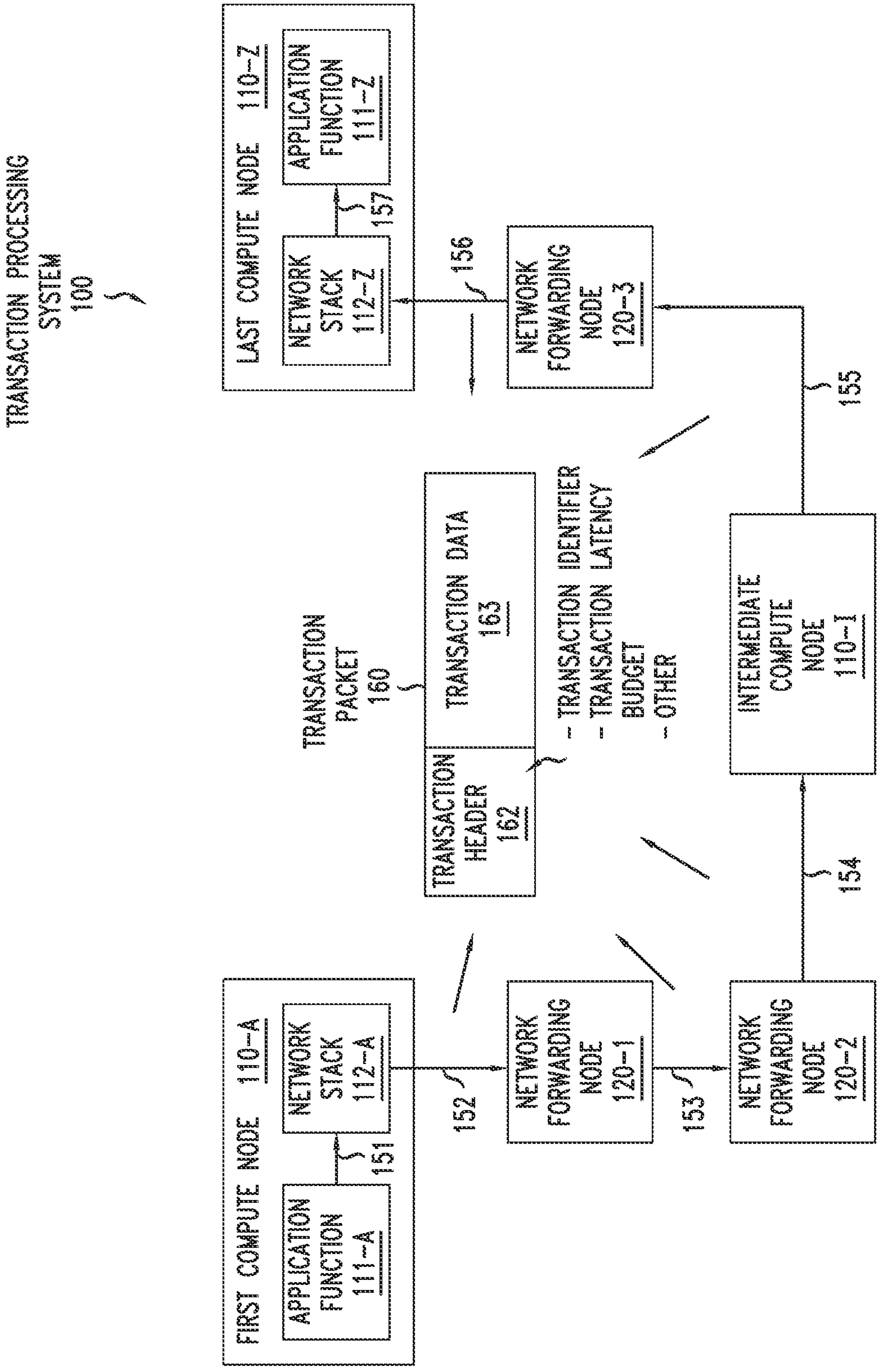

FIG. 1
TRANSACTION PROCESSING SYSTEM 100
LAST COMPUTE NODE 110-Z
NETWORK STACK 112-Z
APPLICATION FUNCTION 111-Z
157
156
NETWORK FORWARDING NODE 120-3
155
TRANSACTION PACKET 160
TRANSACTION HEADER 162
TRANSACTION DATA 163
- TRANSACTION IDENTIFIER
- TRANSACTION LATENCY BUDGET
- OTHER
INTERMEDIATE COMPUTE NODE 110-1
154
FIRST COMPUTE NODE 110-A
APPLICATION FUNCTION 111-A
NETWORK STACK 112-A
151
152
NETWORK FORWARDING NODE 120-1
153
NETWORK FORWARDING NODE 120-2

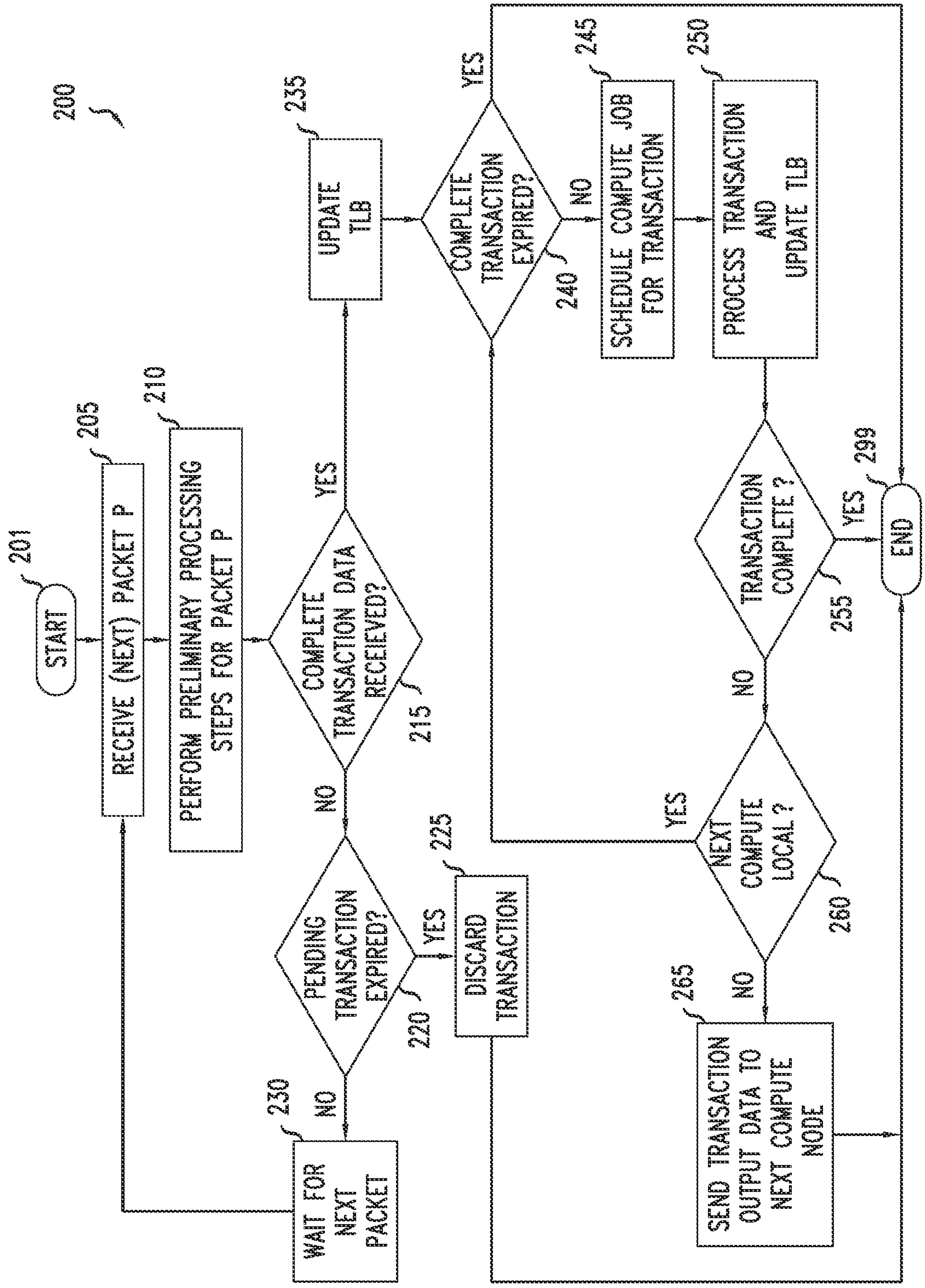

FIG. 2
200
START
201
RECEIVE (NEXT) PACKET P
205
PERFORM PRELIMINARY PROCESSING STEPS FOR PACKET P
210
COMPLETE TRANSACTION DATA RECEIEVED?
215
YES
NO
PENDING TRANSACTION EXPIRED?
220
NO
YES
WAIT FOR NEXT PACKET
230
DISCARD TRANSACTION
225
UPDATE TLB
235
COMPLETE TRANSACTION EXPIRED?
240
YES
NO
SCHEDULE COMPUTE JOB FOR TRANSACTION
245
PROCESS TRANSACTION AND UPDATE TLB
250
TRANSACTION COMPLETE ?
255
YES
NO
NEXT COMPUTE LOCAL ?
260
YES
NO
SEND TRANSACTION OUTPUT DATA TO NEXT COMPUTE NODE
265
END
299

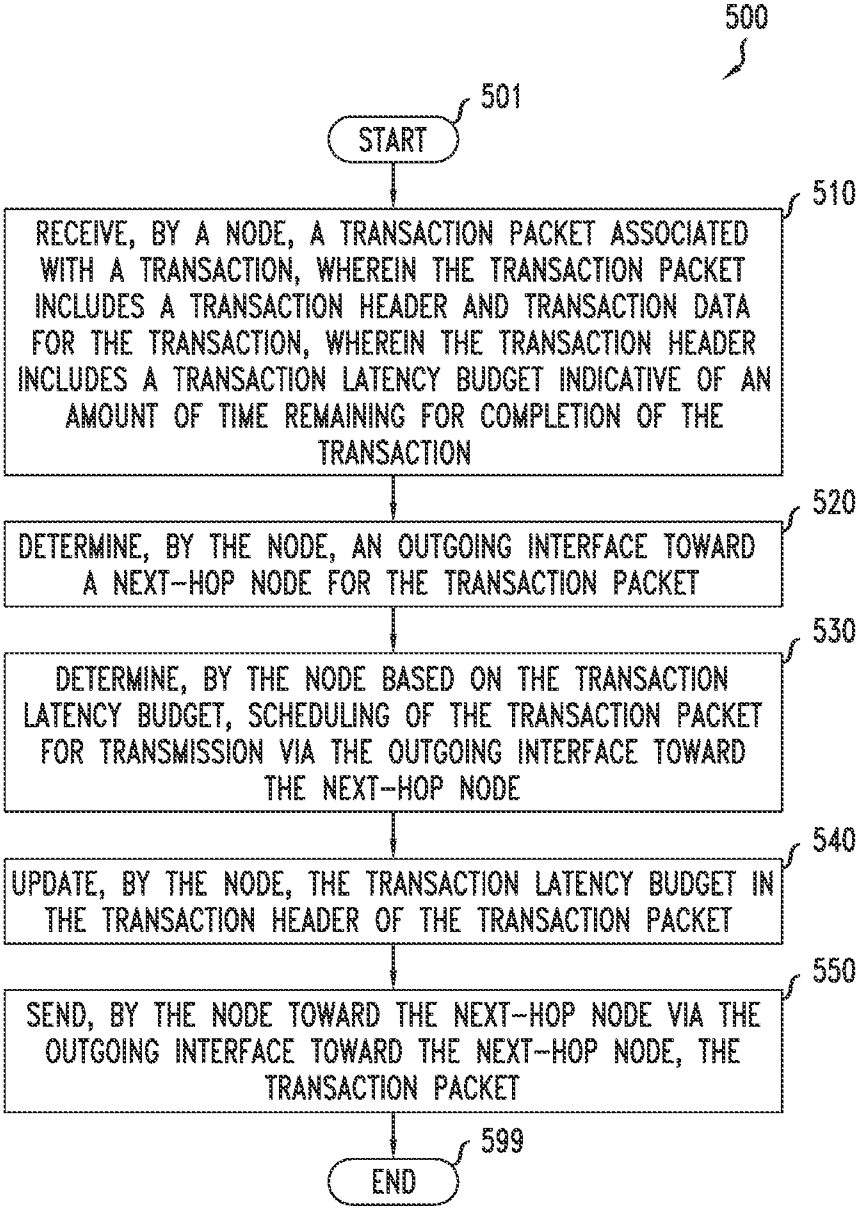

FIG. 5
500
501
START
510
RECEIVE, BY A NODE, A TRANSACTION PACKET ASSOCIATED WITH A TRANSACTION, WHEREIN THE TRANSACTION PACKET INCLUDES A TRANSACTION HEADER AND TRANSACTION DATA FOR THE TRANSACTION, WHEREIN THE TRANSACTION HEADER INCLUDES A TRANSACTION LATENCY BUDGET INDICATIVE OF AN AMOUNT OF TIME REMAINING FOR COMPLETION OF THE TRANSACTION
520
DETERMINE, BY THE NODE, AN OUTGOING INTERFACE TOWARD A NEXT-HOP NODE FOR THE TRANSACTION PACKET
530
DETERMINE, BY THE NODE BASED ON THE TRANSACTION LATENCY BUDGET, SCHEDULING OF THE TRANSACTION PACKET FOR TRANSMISSION VIA THE OUTGOING INTERFACE TOWARD THE NEXT-HOP NODE
540
UPDATE, BY THE NODE, THE TRANSACTION LATENCY BUDGET IN THE TRANSACTION HEADER OF THE TRANSACTION PACKET
550
SEND, BY THE NODE TOWARD THE NEXT-HOP NODE VIA THE OUTGOING INTERFACE TOWARD THE NEXT-HOP NODE, THE TRANSACTION PACKET
599
END

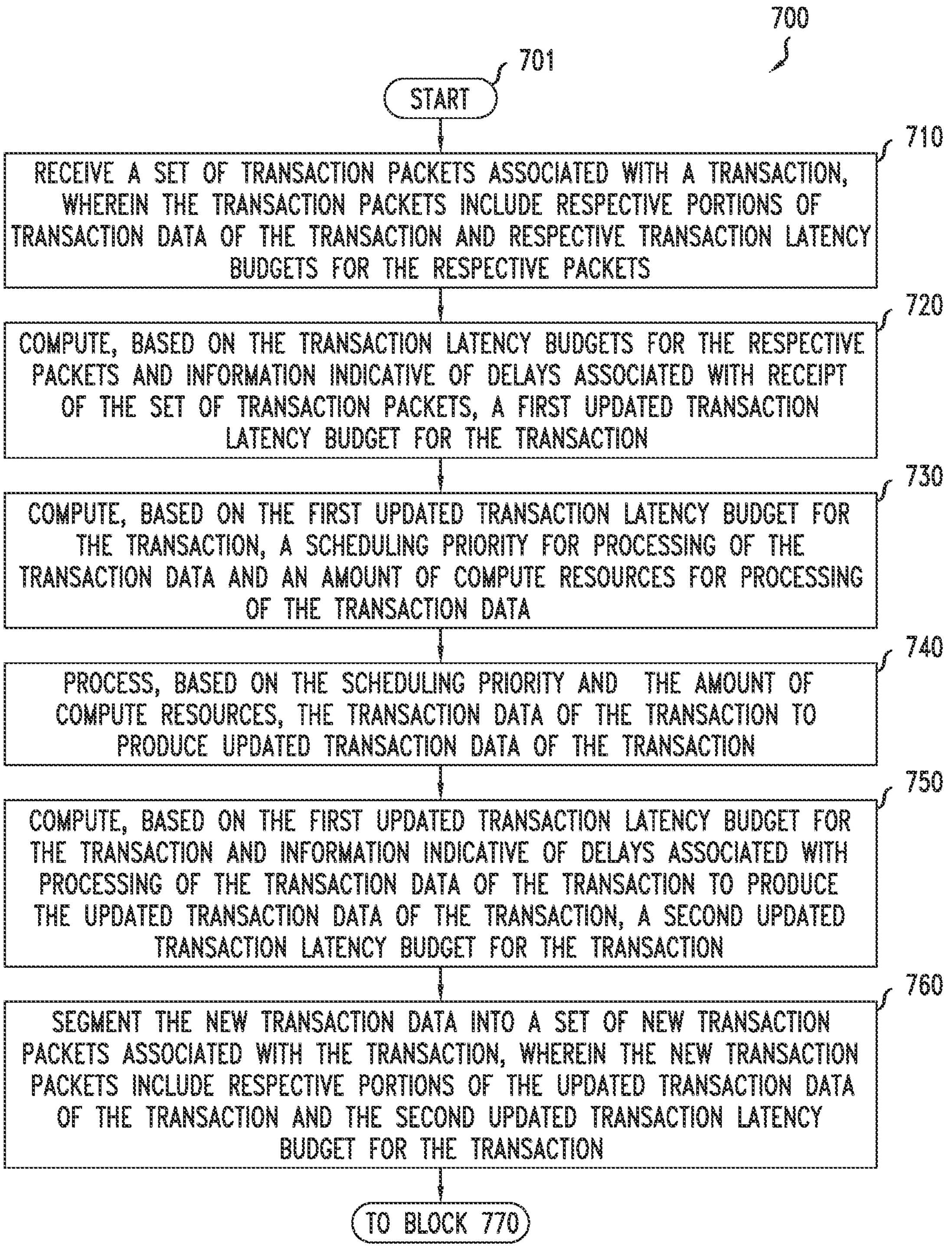

FIG. 7
700
701
START
710
RECEIVE A SET OF TRANSACTION PACKETS ASSOCIATED WITH A TRANSACTION, WHEREIN THE TRANSACTION PACKETS INCLUDE RESPECTIVE PORTIONS OF TRANSACTION DATA OF THE TRANSACTION AND RESPECTIVE TRANSACTION LATENCY BUDGETS FOR THE RESPECTIVE PACKETS
720
COMPUTE, BASED ON THE TRANSACTION LATENCY BUDGETS FOR THE RESPECTIVE PACKETS AND INFORMATION INDICATIVE OF DELAYS ASSOCIATED WITH RECEIPT OF THE SET OF TRANSACTION PACKETS, A FIRST UPDATED TRANSACTION LATENCY BUDGET FOR THE TRANSACTION
730
COMPUTE, BASED ON THE FIRST UPDATED TRANSACTION LATENCY BUDGET FOR THE TRANSACTION, A SCHEDULING PRIORITY FOR PROCESSING OF THE TRANSACTION DATA AND AN AMOUNT OF COMPUTE RESOURCES FOR PROCESSING OF THE TRANSACTION DATA
740
PROCESS, BASED ON THE SCHEDULING PRIORITY AND THE AMOUNT OF COMPUTE RESOURCES, THE TRANSACTION DATA OF THE TRANSACTION TO PRODUCE UPDATED TRANSACTION DATA OF THE TRANSACTION
750
COMPUTE, BASED ON THE FIRST UPDATED TRANSACTION LATENCY BUDGET FOR THE TRANSACTION AND INFORMATION INDICATIVE OF DELAYS ASSOCIATED WITH PROCESSING OF THE TRANSACTION DATA OF THE TRANSACTION TO PRODUCE THE UPDATED TRANSACTION DATA OF THE TRANSACTION, A SECOND UPDATED TRANSACTION LATENCY BUDGET FOR THE TRANSACTION
760
SEGMENT THE NEW TRANSACTION DATA INTO A SET OF NEW TRANSACTION PACKETS ASSOCIATED WITH THE TRANSACTION, WHEREIN THE NEW TRANSACTION PACKETS INCLUDE RESPECTIVE PORTIONS OF THE UPDATED TRANSACTION DATA OF THE TRANSACTION AND THE SECOND UPDATED TRANSACTION LATENCY BUDGET FOR THE TRANSACTION
TO BLOCK 770

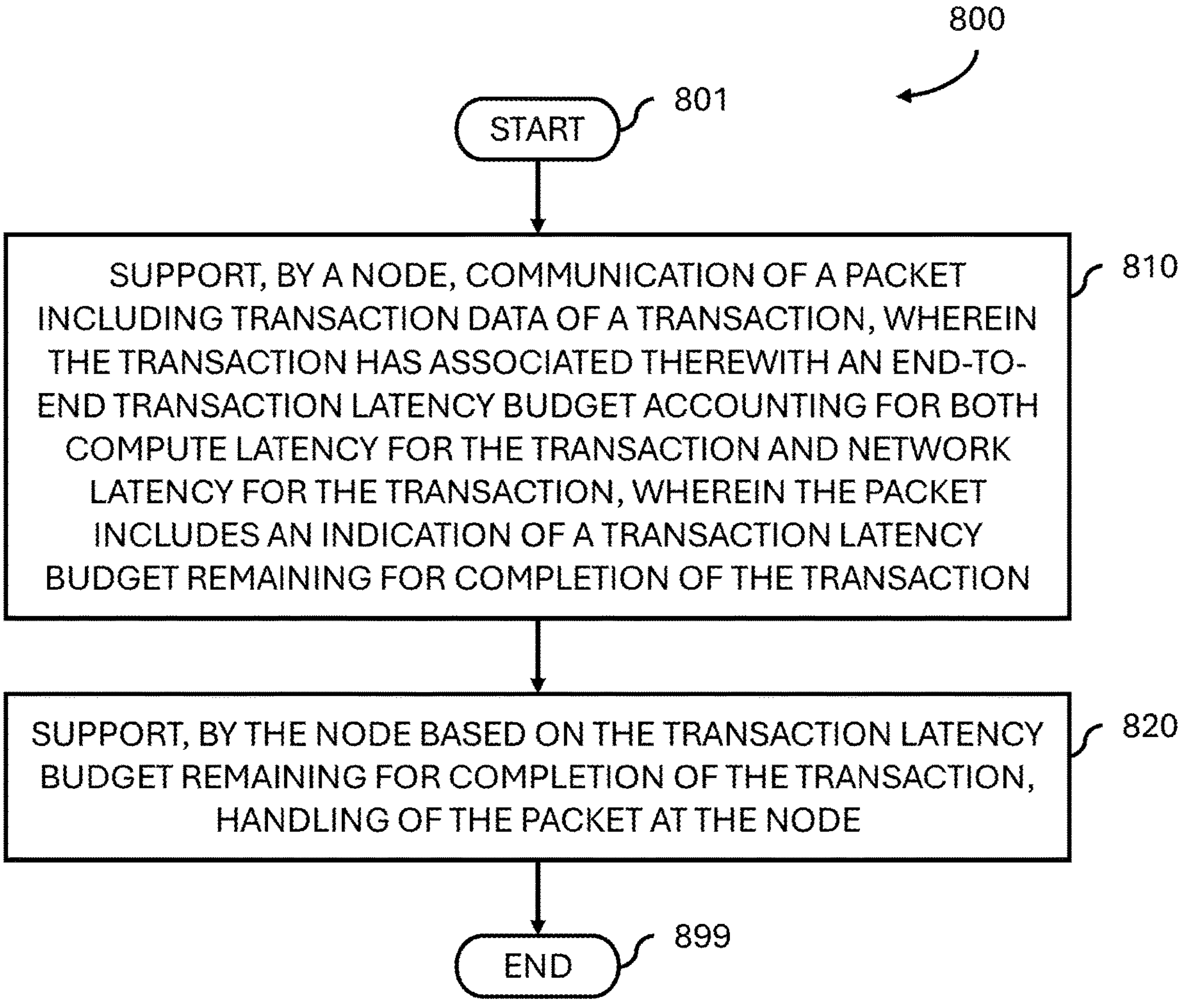

FIG. 8
800
801
START
SUPPORT, BY A NODE, COMMUNICATION OF A PACKET INCLUDING TRANSACTION DATA OF A TRANSACTION, WHEREIN THE TRANSACTION HAS ASSOCIATED THEREWITH AN END-TO-END TRANSACTION LATENCY BUDGET ACCOUNTING FOR BOTH COMPUTE LATENCY FOR THE TRANSACTION AND NETWORK LATENCY FOR THE TRANSACTION, WHEREIN THE PACKET INCLUDES AN INDICATION OF A TRANSACTION LATENCY BUDGET REMAINING FOR COMPLETION OF THE TRANSACTION
810
SUPPORT, BY THE NODE BASED ON THE TRANSACTION LATENCY BUDGET REMAINING FOR COMPLETION OF THE TRANSACTION, HANDLING OF THE PACKET AT THE NODE
820
END
899

ENFORCEMENT OF END-TO-END TRANSACTION LATENCY

TECHNICAL FIELD

Various example embodiments relate generally to communication systems and, more particularly but not exclusively, to enforcing end-to-end transaction latency for transaction-based applications and services provided via communication systems.

BACKGROUND

Various communications technologies may be used to support communications in various types of communication systems.

SUMMARY

In at least some example embodiments, an apparatus includes at least one processor and at least one memory storing instructions which, when executed by the at least one processor, cause the apparatus at least to initialize, by a node, a transaction including transaction data and having associated therewith a transaction identifier, a transaction start time, and an end-to-end transaction latency budget indicative of a length of time allotted for completion of the transaction, generate, by the node, a transaction packet including at least a portion of the transaction data and a transaction header, wherein the transaction header includes the transaction identifier and a transaction latency budget indicative of a length of time remaining for completion of the transaction, wherein the transaction latency budget is based on the end-to-end transaction latency budget, a local handling time of the packet that is determined based on the transaction start time, and a propagation delay from the node to a next-hop node, and send, by the node toward the next-hop node, the transaction packet. In at least some example embodiments, the end-to-end transaction latency budget is selected based on an application with which the transaction is associated. In at least some example embodiments, the instructions, when executed by the at least one processor, cause the apparatus at least to compute, by the node, the local handling time of the packet based on a difference between the transaction start time and a local time of successfully sending the packet from the node toward the next-hop node. In at least some example embodiments, the instructions, when executed by the at least one processor, cause the apparatus at least to determine, by the node, the propagation delay from the node to the next-hop node, wherein the propagation delay from the node to the next-hop node is based on at least one of a network connectivity media type between the node and the next-hop node, a geographic distance between the node and the next-hop node, a configuration of connectivity between the node and the next-hop node, or a network path autodiscovery capability. In at least some example embodiments, the instructions, when executed by the at least one processor, cause the apparatus at least to compute, by the node, the transaction latency budget by subtracting, from the end-to-end transaction latency budget, the local handling time of the packet and the propagation delay from the node to the next-hop node. In at least some example embodiments, the packet is one packet in a set of multiple packets including the transaction data of the transaction, and the transaction header further includes at least one of a packet sequence number of the packet or a total number of packets in the set of multiple packets including the transaction data of the transaction. In at least some example embodiments, the transaction is initialized by an application function of the node, and the packet is generated and sent by a network function of the node.

In at least some example embodiments, a non-transitory computer-readable medium stores computer program instructions which, when executed by an apparatus, cause the apparatus at least to initialize, by a node, a transaction including transaction data and having associated therewith a transaction identifier, a transaction start time, and an end-to-end transaction latency budget indicative of a length of time allotted for completion of the transaction, generate, by the node, a transaction packet including at least a portion of the transaction data and a transaction header, wherein the transaction header includes the transaction identifier and a transaction latency budget indicative of a length of time remaining for completion of the transaction, wherein the transaction latency budget is based on the end-to-end transaction latency budget, a local handling time of the packet that is determined based on the transaction start time, and a propagation delay from the node to a next-hop node, and send, by the node toward the next-hop node, the transaction packet. In at least some example embodiments, the end-to-end transaction latency budget is selected based on an application with which the transaction is associated. In at least some example embodiments, the computer program instructions, when executed by the apparatus, cause the apparatus at least to compute, by the node, the local handling time of the packet based on a difference between the transaction start time and a local time of successfully sending the packet from the node toward the next-hop node. In at least some example embodiments, the computer program instructions, when executed by the apparatus, cause the apparatus at least to determine, by the node, the propagation delay from the node to the next-hop node, wherein the propagation delay from the node to the next-hop node is based on at least one of a network connectivity media type between the node and the next-hop node, a geographic distance between the node and the next-hop node, a configuration of connectivity between the node and the next-hop node, or a network path autodiscovery capability. In at least some example embodiments, the computer program instructions, when executed by the apparatus, cause the apparatus at least to compute, by the node, the transaction latency budget by subtracting, from the end-to-end transaction latency budget, the local handling time of the packet and the propagation delay from the node to the next-hop node. In at least some example embodiments, the packet is one packet in a set of multiple packets including the transaction data of the transaction, and the transaction header further includes at least one of a packet sequence number of the packet or a total number of packets in the set of multiple packets including the transaction data of the transaction. In at least some example embodiments, the transaction is initialized by an application function of the node, and the packet is generated and sent by a network function of the node.

In at least some example embodiments, a method includes initializing, by a node, a transaction including transaction data and having associated therewith a transaction identifier, a transaction start time, and an end-to-end transaction latency budget indicative of a length of time allotted for completion of the transaction, generating, by the node, a transaction packet including at least a portion of the transaction data and a transaction header, wherein the transaction header includes the transaction identifier and a transaction latency budget indicative of a length of time remaining for completion of the transaction, wherein the transaction latency budget is based on the end-to-end transaction latency budget, a local handling time of the packet that is determined based on the transaction start time, and a propagation delay from the node to a next-hop node, and sending, by the node toward the next-hop node, the transaction packet. In at least some example embodiments, the end-to-end transaction latency budget is selected based on an application with which the transaction is associated. In at least some example embodiments, the method includes computing, by the node, the local handling time of the packet based on a difference between the transaction start time and a local time of successfully sending the packet from the node toward the next-hop node. In at least some example embodiments, the method includes determining, by the node, the propagation delay from the node to the next-hop node, wherein the propagation delay from the node to the next-hop node is based on at least one of a network connectivity media type between the node and the next-hop node, a geographic distance between the node and the next-hop node, a configuration of connectivity between the node and the next-hop node, or a network path autodiscovery capability. In at least some example embodiments, the method includes computing, by the node, the transaction latency budget by subtracting, from the end-to-end transaction latency budget, the local handling time of the packet and the propagation delay from the node to the next-hop node. In at least some example embodiments, the packet is one packet in a set of multiple packets including the transaction data of the transaction, and the transaction header further includes at least one of a packet sequence number of the packet or a total number of packets in the set of multiple packets including the transaction data of the transaction. In at least some example embodiments, the transaction is initialized by an application function of the node, and the packet is generated and sent by a network function of the node.

In at least some example embodiments, an apparatus includes means for initializing, by a node, a transaction including transaction data and having associated therewith a transaction identifier, a transaction start time, and an end-to-end transaction latency budget indicative of a length of time allotted for completion of the transaction, means for generating, by the node, a transaction packet including at least a portion of the transaction data and a transaction header, wherein the transaction header includes the transaction identifier and a transaction latency budget indicative of a length of time remaining for completion of the transaction, wherein the transaction latency budget is based on the end-to-end transaction latency budget, a local handling time of the packet that is determined based on the transaction start time, and a propagation delay from the node to a next-hop node, and means for sending, by the node toward the next-hop node, the transaction packet. In at least some example embodiments, the end-to-end transaction latency budget is selected based on an application with which the transaction is associated. In at least some example embodiments, the apparatus includes means for computing, by the node, the local handling time of the packet based on a difference between the transaction start time and a local time of successfully sending the packet from the node toward the next-hop node. In at least some example embodiments, the apparatus includes means for determining, by the node, the propagation delay from the node to the next-hop node, wherein the propagation delay from the node to the next-hop node is based on at least one of a network connectivity media type between the node and the next-hop node, a geographic distance between the node and the next-hop node, a configuration of connectivity between the node and the next-hop node, or a network path autodiscovery capability. In at least some example embodiments, the apparatus includes means for computing, by the node, the transaction latency budget by subtracting, from the end-to-end transaction latency budget, the local handling time of the packet and the propagation delay from the node to the next-hop node. In at least some example embodiments, the packet is one packet in a set of multiple packets including the transaction data of the transaction, and the transaction header further includes at least one of a packet sequence number of the packet or a total number of packets in the set of multiple packets including the transaction data of the transaction. In at least some example embodiments, the transaction is initialized by an application function of the node, and the packet is generated and sent by a network function of the node.

In at least some example embodiments, an apparatus includes at least one processor and at least one memory storing instructions which, when executed by the at least one processor, cause the apparatus at least to receive, by a node, a transaction packet associated with a transaction, wherein the transaction packet includes a transaction header and transaction data for the transaction, wherein the transaction header includes a transaction latency budget indicative of a length of time remaining for completion of the transaction, determine, by the node, an outgoing interface toward a next-hop node for the transaction packet, determine, by the node based on the transaction latency budget, scheduling of the transaction packet for transmission via the outgoing interface toward the next-hop node, update, by the node, the transaction latency budget in the transaction header of the transaction packet, and send, by the node toward the next-hop node via the outgoing interface toward the next-hop node, the transaction packet. In at least some example embodiments, the transaction latency budget in the transaction header of the transaction packet is updated to remove a length of time between a time at which the transaction packet is received by the node and a time at which the packet is sent by the node and to remove a propagation delay between the node and the next-hop node. In at least some example embodiments, to update the transaction latency budget in the transaction header of the transaction packet, the instructions, when executed by the at least one processor, cause the apparatus to determine, by the node based on a difference between a local receive timestamp corresponding to a time at which the transaction packet was received at the node and a local send timestamp corresponding to a time at which the transaction packet is sent by the node toward the next-hop node, a local handling time of the transaction packet at the node, determine by the node, a propagation delay between the node and the next-hop node, and subtract, by the node from the transaction latency budget in the transaction header of the transaction packet, the local handling time of the transaction packet at the node and the propagation delay between the node and the next-hop node. In at least some example embodiments, to determine the scheduling of the transaction packet for transmission via the outgoing interface, the instructions, when executed by the at least one processor, cause the apparatus to queue, by the node using a packet scheduler associated with the outgoing interface toward the next-hop node based on the transaction latency budget included in the transaction packet when the transaction packet was received, the transaction packet in a push-in-first-out queue ordered based on an increasing order of transaction latency budget values.

In at least some example embodiments, a non-transitory computer-readable medium stores computer program instructions which, when executed by an apparatus, cause the apparatus at least to receive, by a node, a transaction packet associated with a transaction, wherein the transaction packet includes a transaction header and transaction data for the transaction, wherein the transaction header includes a transaction latency budget indicative of a length of time remaining for completion of the transaction, determine, by the node, an outgoing interface toward a next-hop node for the transaction packet, determine, by the node based on the transaction latency budget, scheduling of the transaction packet for transmission via the outgoing interface toward the next-hop node, update, by the node, the transaction latency budget in the transaction header of the transaction packet, and send, by the node toward the next-hop node via the outgoing interface toward the next-hop node, the transaction packet. In at least some example embodiments, the transaction latency budget in the transaction header of the transaction packet is updated to remove a length of time between a time at which the transaction packet is received by the node and a time at which the packet is sent by the node and to remove a propagation delay between the node and the next-hop node. In at least some example embodiments, to update the transaction latency budget in the transaction header of the transaction packet, the computer program instructions, when executed by the apparatus, cause the apparatus to determine, by the node based on a difference between a local receive timestamp corresponding to a time at which the transaction packet was received at the node and a local send timestamp corresponding to a time at which the transaction packet is sent by the node toward the next-hop node, a local handling time of the transaction packet at the node, determine by the node, a propagation delay between the node and the next-hop node, and subtract, by the node from the transaction latency budget in the transaction header of the transaction packet, the local handling time of the transaction packet at the node and the propagation delay between the node and the next-hop node. In at least some example embodiments, to determine the scheduling of the transaction packet for transmission via the outgoing interface, the computer program instructions, when executed by the apparatus, cause the apparatus to queue, by the node using a packet scheduler associated with the outgoing interface toward the next-hop node based on the transaction latency budget included in the transaction packet when the transaction packet was received, the transaction packet in a push-in-first-out queue ordered based on an increasing order of transaction latency budget values.

In at least some example embodiments, a method includes receiving, by a node, a transaction packet associated with a transaction, wherein the transaction packet includes a transaction header and transaction data for the transaction, wherein the transaction header includes a transaction latency budget indicative of a length of time remaining for completion of the transaction, determining, by the node, an outgoing interface toward a next-hop node for the transaction packet, determining, by the node based on the transaction latency budget, scheduling of the transaction packet for transmission via the outgoing interface toward the next-hop node, updating, by the node, the transaction latency budget in the transaction header of the transaction packet, and sending, by the node toward the next-hop node via the outgoing interface toward the next-hop node, the transaction packet. In at least some example embodiments, the transaction latency budget in the transaction header of the transaction packet is updated to remove a length of time between a time at which the transaction packet is received by the node and a time at which the packet is sent by the node and to remove a propagation delay between the node and the next-hop node. In at least some example embodiments, updating the transaction latency budget in the transaction header of the transaction packet includes determining, by the node based on a difference between a local receive timestamp corresponding to a time at which the transaction packet was received at the node and a local send timestamp corresponding to a time at which the transaction packet is sent by the node toward the next-hop node, a local handling time of the transaction packet at the node, determining, by the node, a propagation delay between the node and the next-hop node, and subtracting, by the node from the transaction latency budget in the transaction header of the transaction packet, the local handling time of the transaction packet at the node and the propagation delay between the node and the next-hop node. In at least some example embodiments, determining the scheduling of the transaction packet for transmission via the outgoing interface includes queueing, by the node using a packet scheduler associated with the outgoing interface toward the next-hop node based on the transaction latency budget included in the transaction packet when the transaction packet was received, the transaction packet in a push-in-first-out queue ordered based on an increasing order of transaction latency budget values.

In at least some example embodiments, an apparatus includes means for receiving, by a node, a transaction packet associated with a transaction, wherein the transaction packet includes a transaction header and transaction data for the transaction, wherein the transaction header includes a transaction latency budget indicative of a length of time remaining for completion of the transaction, means for determining, by the node, an outgoing interface toward a next-hop node for the transaction packet, means for determining, by the node based on the transaction latency budget, means for scheduling of the transaction packet for transmission via the outgoing interface toward the next-hop node, means for updating, by the node, the transaction latency budget in the transaction header of the transaction packet, and means for sending, by the node toward the next-hop node via the outgoing interface toward the next-hop node, the transaction packet. In at least some example embodiments, the transaction latency budget in the transaction header of the transaction packet is updated to remove a length of time between a time at which the transaction packet is received by the node and a time at which the packet is sent by the node and to remove a propagation delay between the node and the next-hop node. In at least some example embodiments, the means for updating the transaction latency budget in the transaction header of the transaction packet includes means for determining, by the node based on a difference between a local receive timestamp corresponding to a time at which the transaction packet was received at the node and a local send timestamp corresponding to a time at which the transaction packet is sent by the node toward the next-hop node, a local handling time of the transaction packet at the node, means for determining, by the node, a propagation delay between the node and the next-hop node, and means for subtracting, by the node from the transaction latency budget in the transaction header of the transaction packet, the local handling time of the transaction packet at the node and the propagation delay between the node and the next-hop node. In at least some example embodiments, the means for determining the scheduling of the transaction packet for transmission via the outgoing interface includes means for queueing, by the node using a packet scheduler associated with the outgoing interface toward the next-hop node based on the transaction latency budget included in the transaction packet when the transaction packet was received, the transaction packet in a push-in-first-out queue ordered based on an increasing order of transaction latency budget values.

In at least some example embodiments, an apparatus includes at least one processor, and at least one memory storing instructions which, when executed by the at least one processor, cause the apparatus at least to receive a set of transaction packets associated with a transaction, wherein the transaction packets include respective portions of transaction data of the transaction and respective transaction latency budgets for the respective packets, compute, based on the transaction latency budgets for the respective packets and information indicative of delays associated with receipt of the set of transaction packets, a first updated transaction latency budget for the transaction, compute, based on the first updated transaction latency budget for the transaction, a scheduling priority for processing of the transaction data and an amount of compute resources for processing of the transaction data, process, based on the scheduling priority and the amount of compute resources, the transaction data of the transaction to produce updated transaction data of the transaction, compute, based on the first updated transaction latency budget for the transaction and information indicative of delays associated with processing of the transaction data of the transaction to produce the updated transaction data of the transaction, a second updated transaction latency budget for the transaction, segment the new transaction data into a set of new transaction packets associated with the transaction, wherein the new transaction packets include respective portions of the updated transaction data of the transaction and the second updated transaction latency budget for the transaction, schedule, based on the second updated transaction latency budget for the transaction, sending of the new transaction packets, compute, based on the second updated transaction latency budget for the transaction and information indicative of delays associated with sending of the new transaction packets, respective new transaction latency budgets for the new packets, and send the new transaction packets associated with the transaction, wherein the new transaction packets include respective portions of the updated transaction data of the transaction and the respective new transaction latency budgets for the new packets. In at least some example embodiments, to compute the first updated transaction latency budget for the transaction, the instructions, when executed by the at least one processor, cause the apparatus at least to determine, for the transaction packets, respective timestamps indicative of local times of receipt of the respective transaction packets, compute, for each of the transaction packets in an order in which the transaction packets are received, a respective remaining transaction latency budget by selecting a minimum of (1) the respective transaction latency budget for the respective packet and (2) a difference between the respective remaining transaction latency budget computed for the previously received transaction packet and a difference between the respective timestamp of the respective transaction packet and the respective timestamp of the previously received transaction packet, and select, as the first updated transaction latency budget for the transaction, the respective remaining transaction latency budget computed for the last of the transaction packets that is received. In at least some example embodiments, the scheduling priority is inversely related to the first updated transaction latency budget for the transaction. In at least some example embodiments, the scheduling priority is further based on an estimate of an amount of transaction processing to be performed for processing of the transaction data. In at least some example embodiments, the amount of compute resources is inversely related to the first updated transaction latency budget for the transaction. In at least some example embodiments, to compute the second updated transaction latency budget for the transaction, the instructions, when executed by the at least one processor, cause the apparatus at least to determine a processing delay as a difference between a time at which processing of the transaction data began and a time at which processing of the transaction data ended, and compute the updated transaction latency budget for the transaction by subtracting the processing delay from the first updated transaction latency budget for the transaction. In at least some example embodiments, the processing of the transaction data of the transaction to produce the updated transaction data of the transaction is performed across multiple compute jobs, wherein the second updated transaction latency budget for the transaction is computed by updating transaction latency budget values for each of the multiple compute jobs. In at least some example embodiments, the scheduling priority for scheduling sending of the new transaction packets is inversely related to the second updated transaction latency budget for the transaction.

In at least some example embodiments, a non-transitory computer-readable medium stores computer program instructions which, when executed by an apparatus, cause the apparatus at least to receive a set of transaction packets associated with a transaction, wherein the transaction packets include respective portions of transaction data of the transaction and respective transaction latency budgets for the respective packets, compute, based on the transaction latency budgets for the respective packets and information indicative of delays associated with receipt of the set of transaction packets, a first updated transaction latency budget for the transaction, compute, based on the first updated transaction latency budget for the transaction, a scheduling priority for processing of the transaction data and an amount of compute resources for processing of the transaction data, process, based on the scheduling priority and the amount of compute resources, the transaction data of the transaction to produce updated transaction data of the transaction, compute, based on the first updated transaction latency budget for the transaction and information indicative of delays associated with processing of the transaction data of the transaction to produce the updated transaction data of the transaction, a second updated transaction latency budget for the transaction, segment the new transaction data into a set of new transaction packets associated with the transaction, wherein the new transaction packets include respective portions of the updated transaction data of the transaction and the second updated transaction latency budget for the transaction, schedule, based on the second updated transaction latency budget for the transaction, sending of the new transaction packets, compute, based on the second updated transaction latency budget for the transaction and information indicative of delays associated with sending of the new transaction packets, respective new transaction latency budgets for the new packets, and send the new transaction packets associated with the transaction, wherein the new transaction packets include respective portions of the updated transaction data of the transaction and the respective new transaction latency budgets for the new packets. In at least some example embodiments, to compute the first updated transaction latency budget for the transaction, the computer program instructions, when executed by the apparatus, cause the apparatus at least to determine, for the transaction packets, respective timestamps indicative of local times of receipt of the respective transaction packets, compute, for each of the transaction packets in an order in which the transaction packets are received, a respective remaining transaction latency budget by selecting a minimum of (1) the respective transaction latency budget for the respective packet and (2) a difference between the respective remaining transaction latency budget computed for the previously received transaction packet and a difference between the respective timestamp of the respective transaction packet and the respective timestamp of the previously received transaction packet, and select, as the first updated transaction latency budget for the transaction, the respective remaining transaction latency budget computed for the last of the transaction packets that is received. In at least some example embodiments, the scheduling priority is inversely related to the first updated transaction latency budget for the transaction. In at least some example embodiments, the scheduling priority is further based on an estimate of an amount of transaction processing to be performed for processing of the transaction data. In at least some example embodiments, the amount of compute resources is inversely related to the first updated transaction latency budget for the transaction. In at least some example embodiments, to compute the second updated transaction latency budget for the transaction, the computer program instructions, when executed by the apparatus, cause the apparatus at least to determine a processing delay as a difference between a time at which processing of the transaction data began and a time at which processing of the transaction data ended, and compute the updated transaction latency budget for the transaction by subtracting the processing delay from the first updated transaction latency budget for the transaction. In at least some example embodiments, the processing of the transaction data of the transaction to produce the updated transaction data of the transaction is performed across multiple compute jobs, wherein the second updated transaction latency budget for the transaction is computed by updating transaction latency budget values for each of the multiple compute jobs. In at least some example embodiments, the scheduling priority for scheduling sending of the new transaction packets is inversely related to the second updated transaction latency budget for the transaction.

In at least some example embodiments, a method includes receiving a set of transaction packets associated with a transaction, wherein the transaction packets include respective portions of transaction data of the transaction and respective transaction latency budgets for the respective packets, computing, based on the transaction latency budgets for the respective packets and information indicative of delays associated with receipt of the set of transaction packets, a first updated transaction latency budget for the transaction, computing, based on the first updated transaction latency budget for the transaction, a scheduling priority for processing of the transaction data and an amount of compute resources for processing of the transaction data, processing, based on the scheduling priority and the amount of compute resources, the transaction data of the transaction to produce updated transaction data of the transaction, computing, based on the first updated transaction latency budget for the transaction and information indicative of delays associated with processing of the transaction data of the transaction to produce the updated transaction data of the transaction, a second updated transaction latency budget for the transaction, segmenting the new transaction data into a set of new transaction packets associated with the transaction, wherein the new transaction packets include respective portions of the updated transaction data of the transaction and the second updated transaction latency budget for the transaction, scheduling, based on the second updated transaction latency budget for the transaction, sending of the new transaction packets, computing, based on the second updated transaction latency budget for the transaction and information indicative of delays associated with sending of the new transaction packets, respective new transaction latency budgets for the new packets, and sending the new transaction packets associated with the transaction, wherein the new transaction packets include respective portions of the updated transaction data of the transaction and the respective new transaction latency budgets for the new packets. In at least some example embodiments, computing the first updated transaction latency budget for the transaction includes determining, for the transaction packets, respective timestamps indicative of local times of receipt of the respective transaction packets, computing, for each of the transaction packets in an order in which the transaction packets are received, a respective remaining transaction latency budget by selecting a minimum of (1) the respective transaction latency budget for the respective packet and (2) a difference between the respective remaining transaction latency budget computed for the previously received transaction packet and a difference between the respective timestamp of the respective transaction packet and the respective timestamp of the previously received transaction packet, and selecting, as the first updated transaction latency budget for the transaction, the respective remaining transaction latency budget computed for the last of the transaction packets that is received. In at least some example embodiments, the scheduling priority is inversely related to the first updated transaction latency budget for the transaction. In at least some example embodiments, the scheduling priority is further based on an estimate of an amount of transaction processing to be performed for processing of the transaction data. In at least some example embodiments, the amount of compute resources is inversely related to the first updated transaction latency budget for the transaction. In at least some example embodiments, computing the second updated transaction latency budget for the transaction includes determining a processing delay as a difference between a time at which processing of the transaction data began and a time at which processing of the transaction data ended, and computing the updated transaction latency budget for the transaction by subtracting the processing delay from the first updated transaction latency budget for the transaction. In at least some example embodiments, the processing of the transaction data of the transaction to produce the updated transaction data of the transaction is performed across multiple compute jobs, wherein the second updated transaction latency budget for the transaction is computed by updating transaction latency budget values for each of the multiple compute jobs. In at least some example embodiments, the scheduling priority for scheduling sending of the new transaction packets is inversely related to the second updated transaction latency budget for the transaction.

In at least some example embodiments, an apparatus includes means for receiving a set of transaction packets associated with a transaction, wherein the transaction packets include respective portions of transaction data of the transaction and respective transaction latency budgets for the respective packets, means for computing, based on the transaction latency budgets for the respective packets and information indicative of delays associated with receipt of the set of transaction packets, a first updated transaction latency budget for the transaction, means for computing, based on the first updated transaction latency budget for the transaction, a scheduling priority for processing of the transaction data and an amount of compute resources for processing of the transaction data, means for processing, based on the scheduling priority and the amount of compute resources, the transaction data of the transaction to produce updated transaction data of the transaction, means for computing, based on the first updated transaction latency budget for the transaction and information indicative of delays associated with processing of the transaction data of the transaction to produce the updated transaction data of the transaction, a second updated transaction latency budget for the transaction, means for segmenting the new transaction data into a set of new transaction packets associated with the transaction, wherein the new transaction packets include respective portions of the updated transaction data of the transaction and the second updated transaction latency budget for the transaction, means for scheduling, based on the second updated transaction latency budget for the transaction, sending of the new transaction packets, means for computing, based on the second updated transaction latency budget for the transaction and information indicative of delays associated with sending of the new transaction packets, respective new transaction latency budgets for the new packets, and means for sending the new transaction packets associated with the transaction, wherein the new transaction packets include respective portions of the updated transaction data of the transaction and the respective new transaction latency budgets for the new packets. In at least some example embodiments, the means for computing the first updated transaction latency budget for the transaction includes means for determining, for the transaction packets, respective timestamps indicative of local times of receipt of the respective transaction packets, means for computing, for each of the transaction packets in an order in which the transaction packets are received, a respective remaining transaction latency budget by selecting a minimum of (1) the respective transaction latency budget for the respective packet and (2) a difference between the respective remaining transaction latency budget computed for the previously received transaction packet and a difference between the respective timestamp of the respective transaction packet and the respective timestamp of the previously received transaction packet, and means for selecting, as the first updated transaction latency budget for the transaction, the respective remaining transaction latency budget computed for the last of the transaction packets that is received. In at least some example embodiments, the scheduling priority is inversely related to the first updated transaction latency budget for the transaction. In at least some example embodiments, the scheduling priority is further based on an estimate of an amount of transaction processing to be performed for processing of the transaction data. In at least some example embodiments, the amount of compute resources is inversely related to the first updated transaction latency budget for the transaction. In at least some example embodiments, the means for computing the second updated transaction latency budget for the transaction includes means for determining a processing delay as a difference between a time at which processing of the transaction data began and a time at which processing of the transaction data ended, and means for computing the updated transaction latency budget for the transaction by subtracting the processing delay from the first updated transaction latency budget for the transaction. In at least some example embodiments, the processing of the transaction data of the transaction to produce the updated transaction data of the transaction is performed across multiple compute jobs, wherein the second updated transaction latency budget for the transaction is computed by updating transaction latency budget values for each of the multiple compute jobs. In at least some example embodiments, the scheduling priority for scheduling sending of the new transaction packets is inversely related to the second updated transaction latency budget for the transaction.

In at least some example embodiments, an apparatus includes at least one processor, and at least one memory storing instructions which, when executed by the at least one processor, cause the apparatus at least to support, by a node, communication of a packet including transaction data of a transaction, wherein the transaction has associated therewith an end-to-end transaction latency budget accounting for both compute latency for the transaction and network latency for the transaction, wherein the packet includes an indication of a transaction latency budget remaining for completion of the transaction, and support, by the node based on the transaction latency budget remaining for completion of the transaction, handling of the packet at the node. In at least some example embodiments, a non-transitory computer-readable medium stores computer program instructions which, when executed by an apparatus, cause the apparatus at least to support, by a node, communication of a packet including transaction data of a transaction, wherein the transaction has associated therewith an end-to-end transaction latency budget accounting for both compute latency for the transaction and network latency for the transaction, wherein the packet includes an indication of a transaction latency budget remaining for completion of the transaction, and supporting, by the node based on the transaction latency budget remaining for completion of the transaction, handling of the packet at the node. In at least some example embodiments, a method includes supporting, by a node, communication of a packet including transaction data of a transaction, wherein the transaction has associated therewith an end-to-end transaction latency budget accounting for both compute latency for the transaction and network latency for the transaction, wherein the packet includes an indication of a transaction latency budget remaining for completion of the transaction, and supporting, by the node based on the transaction latency budget remaining for completion of the transaction, handling of the packet at the node. In at least some example embodiments, an apparatus includes means for supporting, by a node, communication of a packet including transaction data of a transaction, wherein the transaction has associated therewith an end-to-end transaction latency budget accounting for both compute latency for the transaction and network latency for the transaction, wherein the packet includes an indication of a transaction latency budget remaining for completion of the transaction, and means for supporting, by the node based on the transaction latency budget remaining for completion of the transaction, handling of the packet at the node. In at least some example embodiments, the transaction header is adjacent to one of a transmission control protocol (TCP) header, a user datagram protocol (UDP) header, or a virtual extensible local area network (VXLAN) header. In at least some example embodiments, the transaction header is included within at least one transmission control protocol (TCP) option or at least one internet protocol (IP) option. In at least some example embodiments, the transaction header is a shim header adjacent to a link layer header. In at least some example embodiments, the transaction header is adjacent to an internet protocol (IP) tunnel header.

BRIEF DESCRIPTION OF THE DRAWINGS

The teachings herein can be readily understood by considering the following detailed description in conjunction with the accompanying drawings, in which:

FIG. 1 depicts an example embodiment of a transaction processing system configured to support enforcement of end-to-end transaction latency for transactions of transaction-based applications and services;

FIG. 2 depicts an example embodiment of a method for use by a compute node to support handling of packetized transaction data of a transaction of a transaction-based application or service in a manner for supporting enforcement of end-to-end transaction latency for the transaction of the transaction-based application or service;

FIG. 5 depicts an example embodiment of a method for use by a network forwarding node for handling a transaction packet of a transaction of a transaction-based application or service in a manner for supporting enforcement of end-to-end transaction latency for the transaction of the transaction-based application or service;

FIG. 7 depicts an example embodiment of a method for use by a node to support enforcement of end-to-end transaction latency for a transaction of a transaction-based application or service;

FIG. 8 depicts an example embodiment of a method for use by a node to support enforcement of end-to-end transaction latency for a transaction of a transaction-based application or service.

To facilitate understanding, identical reference numerals have been used herein, wherever possible, in order to designate identical elements that are common among the various figures.

DETAILED DESCRIPTION

Figure 3:
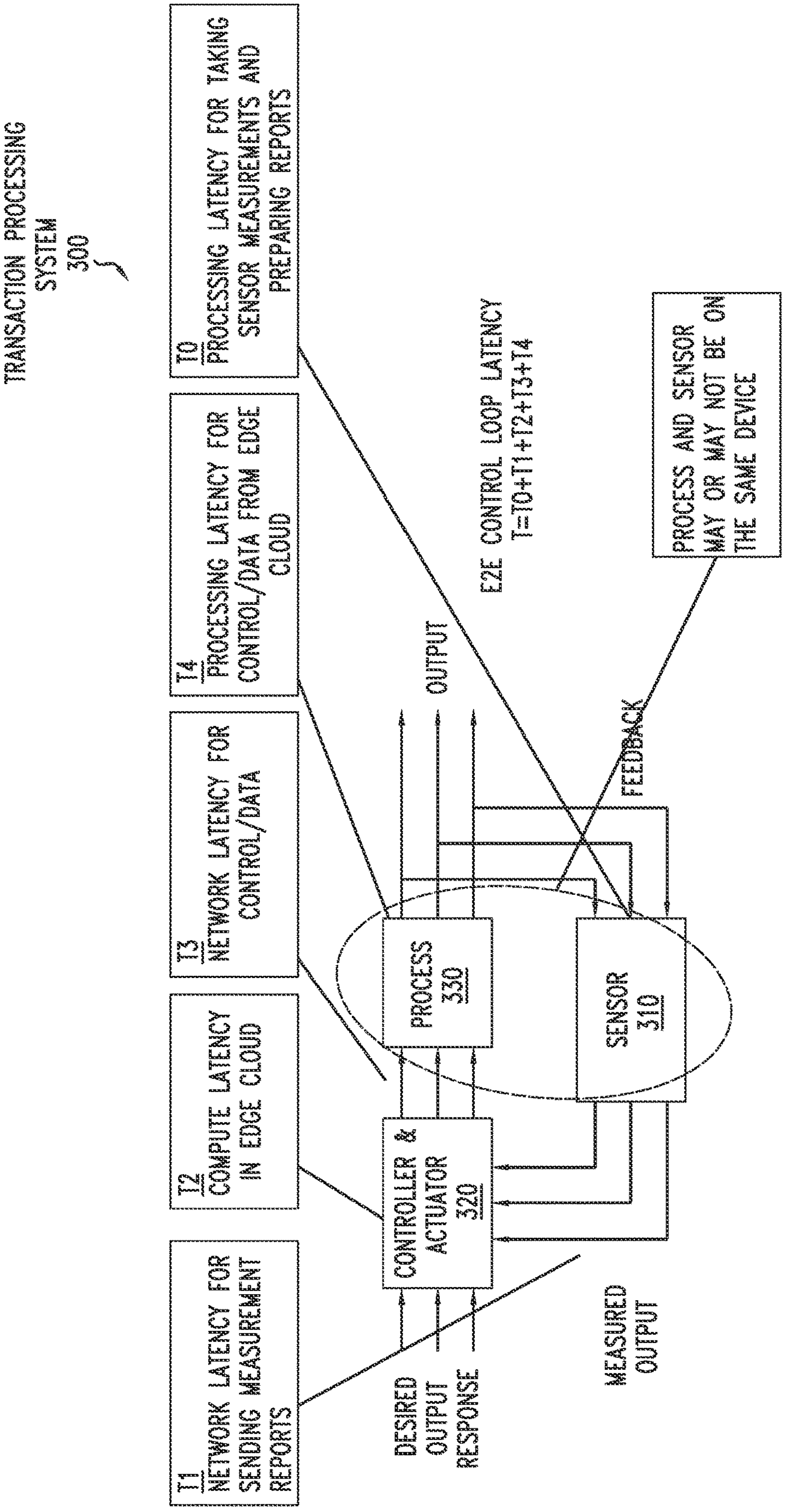
FIG. 3 depicts an example embodiment of a transaction processing system supporting a specific transaction-based application, a cloud control service, for illustrating enforcement of end-to-end transaction latency for the transaction-based application.

Various example embodiments for supporting enforcement of end-to-end transaction latency for transaction-based applications and services are presented herein.

Various example embodiments may be configured to enforce end-to-end transaction latency for transaction-based application and services where the end-to-end transaction latency accounts for both compute latency and network latency. The transaction-based applications and services may include various types of applications and services. The transaction-based applications and services may include various transaction-based applications and services that may be enabled by and dependent upon various compute technologies and/or networking technologies. For example, transaction-based applications and services may include various transaction-based applications and services that may be enabled by wireless broadband access technologies (e.g., Fifth Generation (5G) wireless, Sixth Generation (6G) wireless, or the like, as well as various combinations thereof) and edge cloud based massive compute resources. For example, transaction-based applications and services which may require or benefit from enforcement of end-to-end transaction latency may include applications and services such as mission critical capabilities, automation capabilities (e.g., industrial automation, factory automation, autonomous mining, autonomous vehicles, or the like), extended reality (XR) capabilities (e.g., virtual reality (VR), augmented reality (AR), mixed reality (MR), or the like), health-related capabilities, gaming capabilities, or the like, as well as various combinations thereof.

Various example embodiments may be configured to support enforcement of end-to-end transaction latency for transactions of transaction-based applications and services. Here, the term "transaction" is used to denote an end-to-end operation having a strict total transaction latency budget for completion where the total transaction latency budget includes both compute latency and network latency. For example, a variety of applications and services require deterministic boundaries on end-to-end latency of transactions performed within the context of the applications and services (e.g., as indicated above, mission critical applications, Industry 4.0, autonomous vehicles, VR/AR/MR, health industry, gaming, and so forth). The enforcement of a total end-to-end transaction latency for a transaction of a transaction-based application or service may be supported by associating a transaction latency budget with the transaction data of the transaction and updating the transaction latency budget during execution of the transaction to ensure that the transaction is completed within the total end-to-end transaction latency permitted for the transaction-based application or service. The transaction latency budget may be associated with the transaction data of the transaction by associating, with each transaction packet transporting transaction data of the transaction, a transaction header that include the transaction latency budget. The transaction latency budget may be updated at each node along the end-to-end transaction path, including compute nodes and network forwarding nodes, so that each node along the end-to-end transaction path knows the length of time remaining for completion of the transaction. The transaction latency budget may be used at each node along the end-to-end transaction path for controlling prioritization of the transaction in a manner that attempts to ensure enforcement of the end-to-end transaction latency for the transaction of the transaction-based application or service (e.g., used by compute job schedulers of compute nodes to prioritize scheduling and determine the amount of dynamic compute resources (e.g., CPU, memory, number of threads for parallel processing, or the like) to be assigned to computation tasks for transaction data of transaction packets, and used by network nodes to make queuing/forwarding decisions for transaction packets).

Various example embodiments may be configured to support enforcement of end-to-end transaction latency for transaction-based applications and services in network contexts that may support or require segmentation of transaction data of a transaction across multiple packets. This may be the case, for example, where the network over which the transaction is to be sent has a network packet size limit and the size of the transaction packet for the transaction exceeds that packet size limit. When transaction data of a transaction is segmented across a set of multiple packets, each packet in the set of multiple packets will carry in the packet header of the packet its own transaction latency budget instance for the transaction latency of the transaction. The transaction latency budget instance will be independently updated for the packet as the packet traverses the network from the sending compute node to the receiving compute node (e.g., since different packets in the set of packets may follow different paths which may impact transaction latency budget differently, different packets in the set of packets may experience different impacts to transaction latency budget even where those packets follow the same paths, and so forth). At each packet sending node, for each packet that is sent by the packet sending node, the transaction latency budget instance is updated by subtracting the locally computed elapsed time that the packet spends in the node queue before being sent out to the next-hop node as well as subtracting the network propagation delay for delivering the packet to the next-hop node. When transaction data of a transaction is segmented across a set of multiple packets, at the receiving compute node the transaction data of the transaction is reassembled from the individual packets in the set of multiple packets, and the remaining transaction latency budget for the transaction as a whole is recomputed from individual transaction latency budget instances included within the packets belonging to the same transaction when the packets are received at the receiving compute node. In other words, for network forwarding nodes the transactional latency budget is the individual latency budget of individual packets traversing the network nodes, whereas for compute nodes the transaction latency budget is the re-assembled latency budget for the transaction as a whole.

Various example embodiments may be configured to support enforcement of end-to-end transaction latency for transaction-based applications and services in a manner that enables flexible use of the network and compute resources to enforce total end-to-end transaction latency budget along the end-to-end transaction path. For example, where the actual computation latency is higher than the expected computation latency for the transaction then the extra network resource budget is automatically made available for forwarding the packets carrying data of that transaction over the network to reduce network forwarding latency and meet the overall end-to-end network plus compute transaction latency budget. Conversely, in case of network conditions that cause higher than expected network latency, then the extra compute resource budget is automatically made available for compute operations of the transaction to reduce computation latency and meet the overall end-to-end network plus compute transaction latency budget). As discussed further below, this provides significant scalability for network resource allocation and significant scalability for compute resource allocation, based on prioritization of selected transaction packet delivery by network nodes based on remaining overall transaction latency budget that accounts for an unseparated combination of compute latency and network latency and/or prioritization of selected transaction compute jobs by compute job schedulers based on remaining overall transaction latency budget that accounts for an unseparated combination of compute latency and network latency, in a manner that compensates for tail distribution outliers of delayed compute operation and tail distribution outliers of delayed network delivery. Various example embodiments may be configured to support enforcement of end-to-end transaction latency for transaction-based applications and services based on local clocks on the compute nodes and network nodes by updating the transaction latency budget locally at the nodes based on elapsed time at the nodes, thereby obviating the need for network-wide precise time synchronization across the compute nodes and network nodes.

Various example embodiments may be configured to support enforcement of end-to-end transaction latency for transaction-based applications and services in a manner that enables flexible use of the total end-to-end transaction latency budget for compute latency and network latency along the end-to-end transaction path. This may obviate the need to carve out a fixed network latency budget and have network commitments (service level agreements) formulated in terms of committed network delivery latency. The carved-out fixed budget for network delivery is defined by subtracting out the upfront estimated compute time from the overall budget. The estimated compute time is based on either average compute time or a more conservative worst-case compute time; however, compute time has probabilistic distribution based upon scheduled compute task priority and CPU cache hits or interrupts and context switches. Various example embodiments may be configured to provide improved scalability by obviating the need for setting fixed network budget for worst case scenario of processing time, which is significantly impacts service scalability when a massively overprovisioned network is required to meet worst case scenarios happening in a relatively small percent of transactions. Various example embodiments may be configured to provide improved scalability by obviating the need for setting a fixed network budget for the most prevalent compute processing times (e.g., $90^{th}$ percentile, $95^{th}$ percentile, or the like), which results in not meeting end-to-end transaction budget when compute time exceeds the prevalent time. Various example embodiments may be configured to enable dynamic adjustment of network latency budget based upon actual compute processing time and dynamic adjustment of compute latency budget based on actual network delivery time.

Various example embodiments may be configured to support enforcement of end-to-end transaction latency for transaction-based applications and services in a manner that enables flexible use of the total end-to-end transaction latency budget for network latency associated with transactions. There may be significant variability of network latency times for various reasons, including based on the types of transactional applications and services being supported. For example, defined network delivery latencies may vary for different types of transactional applications and services, such as 100 μs-50 ms for machine-to-machine applications, 500 μs-2 ms for motion control, 4 ms-10 ms for control to control, 4 ms-30 ms for mobile control panels, <1 ms for cooperative motion control for autonomous guided vehicles/robots, 10 ms-50 ms for machine control co-op driving for autonomous guided vehicles/robots, 10 ms-100 ms for operated remote control for autonomous guided vehicles/robots, 5 ms-10 ms for massive wireless sensors, <50 ms RTT for augmented reality and so forth (it will be appreciated that these values are merely examples and that the times may vary for different reasons). Various example embodiments may be configured to provide significant scalability to network resource allocation as compared with use of a separate fixed latency budget for network resources that is separate from the compute latency allocated for compute functions, thereby obviating the need for drastic overprovisioning of network resources for the worst case (outlier) latencies.

Various example embodiments may be configured to support enforcement of end-to-end transaction latency for transaction-based applications and services in a manner that enables flexible use of the total end-to-end transaction latency budget for compute latency associated with transactions. There may be significant variability of compute times for various reasons, such as due to CPU cache misses, interrupts and context switches, or the like, as well as various combinations thereof. For example, regarding cache miss impact on compute operation latency, an L1 cache reference may be 0.5 ns, a branch misprediction may be 5 ns, an L2 cache reference may be 7 ns, a main memory reference may be 100 ns, and so forth (it will be appreciated that these values are merely examples and that the times may vary for different reasons). For example, regarding impacts of interrupts and context switches on compute time, a 4 VCPU per guest scheme may have an average latency of 30 μs and a tail latency of 204 μs, an 8 VCPU per guest scheme may have an average latency of 195 μs and a tail latency of 3954 μs, and so forth. These conditions generally lead to probabilistic distributions of compute time that have relatively long tails. Various example embodiments may be configured to provide significant scalability to compute resource allocation as compared with use of a separate fixed latency budget for compute resources that is separate from the network latency allocated for network delivery, thereby obviating the need for drastic overprovisioning of compute resources for the worst case (outlier) latencies.

It will be appreciated that these as well as various other example embodiments for supporting enforcement of end-to-end transaction latency for transaction-based applications and services may be further understood by first considering various more general aspects of transaction-based applications and services, as discussed further below.

FIG. 1 depicts an example embodiment of a transaction processing system configured to support enforcement of end-to-end transaction latency for transactions of transaction-based applications and services.

The transaction processing system 100 is configured to support a transaction-based application or service. For example, the transaction-based application or service may include one or more of a mission critical application or service, an automation application or service (e.g., industrial automation, factory automation, autonomous mining, autonomous vehicles, or the like), an XR application or service (e.g., VR, AR, MR, or the like), a health-related application or service, a gaming application or service, or the like, as well as various combinations thereof. The transaction processing system 100 is configured to support transactions for the transaction-based application or service. The transaction processing system 100 is configured to support enforcement of end-to-end transaction latency for a transaction of a transaction-based application or service, to ensure that the transaction for the transaction-based application or service is completed within a length of time necessary or desirable for successful operation of the transaction-based application or service. The transaction processing system 100 is configured to support enforcement of end-to-end transaction latency for a transaction of a transaction-based application or service based on flexible use of a total end-to-end transaction latency budget (TLB) for compute latency and network latency along the end-to-end transaction path for the transaction of the transaction-based application or service.

The transaction processing system 100 includes a set of compute nodes 110 configured to perform compute functions for the transaction of the transaction-based application or service. The set of compute nodes 110 includes a first compute node 110-A that initiates the transaction, an intermediate compute node 110-I that supports the transaction, and a last compute node 110-Z that completes the transaction. The compute nodes 110 may be deployed in various locations, which may depend on various factors such as the transaction-based application or service being supported, the implementation of the transaction-based application or service, or the like, as well as various combinations thereof. For example, the compute nodes 110 may be located at customer locations (e.g., within an enterprise network, within a factory for factory automation, at a mine for mining automation, within a vehicle control center for vehicle automation, or the like), within network provider locations (e.g., within a network provider edge cloud, within a network provider network, or the like), a third-party locations (e.g., within an edge cloud, within a data center, or the like), or the like, as well as various combinations thereof. The first compute node 110-A includes an application function (AF) 111-A that initiates the transaction and a network stack (NS) 112-A that supports sending of transaction data of the transaction toward the last compute node 110-Z. The last compute node 110-Z includes a network stack (NS) 112-Z that supports receiving of transaction data of the transaction from the first compute node 110-A and an application function (AF) 111-Z that completes the transaction. It is noted that the details of the intermediate compute node 110-I are omitted for purposes of clarity. The compute nodes 110 may be configured to support various other capabilities for performing compute functions for the transaction of the transaction-based application or service.

The transaction processing system 100 includes a set of network forwarding nodes 120 configured to support forwarding of transaction data between the compute nodes 110 for the transaction of the transaction-based application or service. The set of network forwarding nodes 120 includes a first network forwarding node 120-1 and a second network forwarding node 120-2 disposed between the first compute node 110-A and the intermediate compute node 110-I and a third network forwarding node 120-3 disposed between the intermediate compute node 110-I and the last compute node 110-Z. The network forwarding nodes 120 may be associated with one or more communication networks configured to support communications for the compute nodes 110. The network forwarding nodes 120 may be configured to support forwarding of packets carrying transaction data for the transaction between the compute node 110 based on various networking capabilities. For example, the network forwarding nodes 120 may be configured to support forwarding of packets carrying transaction data for the transaction based on one or more of Multiprotocol Label Switching (MPLS), Virtual Extensible Local Area Networking (VXLAN), Internet Protocol (IP), Transmission Control Protocol (TCP), User Datagram Protocol (UDP), or the like, as well as various combinations thereof. The network forwarding nodes 120 may be configured to support various other capabilities for supporting forwarding of transaction data between compute nodes 110 for the transaction of the transaction-based application or service.

It will be appreciated that, although primarily presented with respect to a specific number of compute nodes 110 (illustratively, three compute nodes 110) and a specific number of network forwarding nodes 120 (illustratively, three network forwarding nodes) for purposes of clarity in describing various functions supported by compute nodes and forwarding nodes, various other numbers and arrangements of compute nodes 110 and/or network forwarding nodes 120 may be used for handling of transactions within the transaction processing system 100.

For example, it will be appreciated that, although presented with respect to example embodiments in which three compute nodes 110 are involved in completion of the transaction, fewer or more compute nodes may be involved in the completion of the transaction (e.g., the transaction may be performed using only the first compute node 110-A and the last compute node 110-Z without a need for the intermediate compute node 110-I there may be one or more additional compute nodes disposed arranged between the first compute node 110-A and the last compute node 110-Z in the transaction flow for performing various types of processing for the transaction before the transaction is completed by the last compute node 110-Z, or the like).

For example, it will be appreciated that, although primarily presented with respect to example embodiments in which three network forwarding nodes 120 are involved in forwarding of transaction data of the transaction between the first compute node 110-A and the last compute node 110-Z, fewer or more network forwarding nodes 120 may be disposed between the first compute node 110-A and the last compute node 110-Z for supporting forwarding of transaction data of the transaction between the first compute node 110-A and the last compute node 110-Z (e.g., there may be one or more network forwarding nodes 120 between any pair of adjacent compute nodes 110 for supporting transport of packets carrying transaction data of the transaction between the first compute node 110-A and the last compute node 110-Z).

In other words, any suitable numbers and arrangements of compute nodes 110 and/or network forwarding nodes 120 (including direct connections of compute nodes 110 without intermediate network forwarding nodes 120, direct connections of network forwarding nodes 120 without intermediate compute nodes 110, use of various network topologies for connecting compute nodes 110 involved in handling of the transaction (e.g., linear chain topologies, hub-and-spoke topologies with a network forwarding node 120 as the hub and compute nodes 110 as the spokes, ring topologies including one or more rings, or the like, as well as various combinations thereof), or the like, as well as various combinations thereof) may be utilized for supporting initialization and completion of the transaction within the context of the transaction processing system 100.

It will be appreciated that the functions of the compute nodes 110 and the network forwarding nodes 120 in supporting a transaction may be further understood by considering details of a process for handling of the transaction within the context of the transaction processing system 100, which is described within the context of blocks indicative of functions performed for handling of the transaction within the context of the transaction processing system 100.

At step 151, the AF 111-A of the first compute node 110-A initiates the transaction, performs processing for the transaction, and passes the transaction to the NS 112-A of the first compute node 110-A for sending the packetized transaction data toward the last compute node 110-Z.

The initiation of the transaction may include obtaining transaction data for the transaction. The transaction data may be obtained by receiving the transaction data for the transaction (e.g., locally from a source disposed within the first compute node 110-A, from one or more sources of such data locally connected to the first compute node 110-A (e.g., from one or more connected sensors, such as a touch screen display sensor, a sound sensor, a temperature sensor, a gyroscope, or the like), from one or more sources of such data remote from the first compute node 110-A, or the like, as well as various combinations thereof, generating the transaction data for the transaction, or the like, as well as various combinations thereof. It is noted that at least some of the transaction data for the transaction also may include transaction output data generated by the AF 111-A based on processing of the transaction by the AF 111-A.

The initiation of the transaction may include setting the transaction identification information for the transaction. The transaction identification information may include a transaction identifier of the transaction, an AF identifier of the AF 111-A that initiates the transaction, a compute node identifier of the first compute node 110-A that initiates the transaction, or the like, as well as various combinations thereof.

The initiation of the transaction may include setting the end-to-end TLB for the transaction (denoted as TLB=T, where T represents the end-to-end TLB value for the transaction). The end-to-end TLB for the transaction represents the total TLB allotted for completion of the transaction, including processing time (e.g., for processing of transaction data at each compute node), queueing time (e.g., including compute job queuing and network transmission queuing), and propagation time (e.g., between nodes involved in supporting the transaction). The value of T may be application-specific and may be set in various ways. For example, the value T may be set based on an application configuration of the application with which the transaction is associated, known latency requirements for specific application types or specific applications, or the like, as well as various combinations thereof. The TLB, as discussed further below, is further updated at each compute node and network node supporting the transaction (e.g., by subtracting the elapsed processing, queueing, and propagation delay times).

The initiation of the transaction may include associating with the transaction a local timestamp indicative of a time at which the transaction started (denoted as S).

The AF 111-A performs processing for the transaction. The processing for the transaction may include application-specific processing for the transaction. The processing for the transaction may result in generation of transaction output data to be included as part of the transaction data for the transaction that is further propagated by the first compute node 110.

It will be appreciated that the AF 111-A of the first compute node 110-A may perform various other functions for supporting initiation of the transaction within the transaction processing system 100.

At step 152, the NS 112-A of the first compute node 110-A transmits the transaction data toward the next node (illustratively, toward the network forwarding node 120-1 for delivery to the intermediate compute node 110-I and, ultimately, to the last compute node 110-Z). The NS 112-A transmits the transaction data toward the next compute node using one or more transaction packets (e.g., in some cases the transaction data may be placed into a single transaction packet, while in other cases the transaction data may be segmented into multiple transaction packets).

The NS 112-A, for each transaction packet transporting transaction data of the transaction, generates the transaction packet including transaction data and an associated transaction header, selects a next-hop node for the transaction packet, and transmits the transaction packet to the next-hop node (which, in this case is network forwarding node 120-1). It is noted that priority of the packet transmission to the next-hop node is determined according to reverse order of the TLB (lower TLB yields higher priority and higher TLB yields lower priority).

The NS 112-A, for each transaction packet transporting transaction data of the transaction, updates the TLB value. The TLB value for the packet P may be updated by removing the elapsed time between the start of the transaction and the sending of the packet and also removing the propagation delay for propagation of the packet from the local node to the next-hop node. Namely, the TLB value may be updated as follows: $TLB(P)=T-(S_1(P)-S)-Prop_n(1)$, where TLB(P) is the updated TLB value for packet P, T is the end-to-end transaction latency budget for the transaction, $S_1(P)$ is the local transmission time of packet P (which is the time at which the packet is successfully transmitted with no further retransmissions required), S is the local timestamp indicative of the time at which the transaction started, and $Prop_n(1)$ is the propagation delay from the local node to the next-hop node (denoted as $Prop_{1\rightarrow 2}(1)$ from the compute node 110-A to the network forwarding node 120-1).

The NS 112-A may obtain the propagation delay $Prop_n(1)$, for use in computing the updated TLB for the transaction packets, in various ways. For example, the propagation delay $Prop_n(1)$ may be statically configured on the first compute node 110, dynamically determined by the first compute node 110, or the like, as well as various combinations thereof. For example, where the propagation delay $Prop_n(1)$ is statically configured on the first compute node 110, the propagation delay $Prop_n(1)$ may be determined based on a combination of the network connectivity media used for the link between the first compute node 110-A and the next-hop node (e.g., Ethernet, optical, WiFi, cellular (e.g., 4G, 5G, 6G, or the like), or the like) and a distance between the first compute node 110-A and the next-hop node. For example, where the propagation delay $Prop_n(1)$ is determined dynamically by the first compute node 110, the propagation delay $Prop_n(1)$ may be determined based on network path auto-discovery. It will be appreciated that the propagation delay $Prop_n(1)$ may be determined in other suitable ways.

The NS 112-A, for each transaction packet transporting transaction data of the transaction, associates a transaction header with the transaction data to form the transaction packet. The transaction header includes the transaction identifier of the transaction and the updated TLB computed for the packet(TLB(P)). The transaction header also may include the AF identifier of the AF 111-A that initiated the transaction. The transaction header, in the case where the transaction data is segmented across multiple packets, also may include a sequence number of the packet P in the sequence of packets in which the transaction data was segmented and a total number of packets in the sequence of packets in which the transaction data was segmented. It will be appreciated that the transaction header may include other information suitable for use in enforcing end-to-end combined compute and network latency for transaction handling.

It is noted that an example embodiment of a transaction packet is illustrated in FIG. 1 as transaction packet 160 including transaction data 161 and transaction header 162. The transaction data 161 and the transaction header 162 for the transaction packet 160 may be placed within the transaction packet 160 in various ways, which may depend on the underlying communication technology being used to support the transaction. For example, the transaction data 161 may form all or part of a payload of a packet based on an underlying protocol such as Multiprotocol Label Switching (MPLS), Internet Protocol (IP), or the like, as well as various combinations thereof. For example, the transaction header 162 may be added immediately following (encapsulating) the outer Transmission Control Protocol (TCP), User Datagram Protocol (UDP), or Virtual Extensible Local Area Network (VXLAN) header (and a special value of the IPv4 Differentiated Services Code Point (DSCP) of IPv6 Traffic Class header fields may be used to indicate the presence of the transaction header 162 within the transaction packet 162). For example, the transaction header 162 may be transported using new IPv6 or TCP header options. For example, the transaction header 162 may be transported using a shim header following the link level header (similar to the manner in which MPLS label headers are carried). For example, the transaction header 161 may be added together with an additional IP tunnel header similar to the VXLAN header. It will be appreciated that the transaction data 161 and the transaction header 162 may be included within the transaction packet 160 in various other ways which may depend upon various aspects of the underlying communication technology being used to support the transaction.

At step 153, the network forwarding node 120-1 forwards packets associated with the transaction toward the next node (illustratively, toward the network forwarding node 120-2 for delivery to the intermediate compute node 110-I and, ultimately, to the last compute node 110-Z). The network forwarding node 120-1 forwards the individual transaction packets carrying transaction data of the transaction.

The network forwarding node 120-1, upon receiving a packet of the transaction, attaches local timestamp $t_0=t_0(P)$ of when the packet was received to the packet context, selects the next network node hop for the packet, determines the outgoing interface on which to forward the packet, uses the TLB within the packet to determine priority of packet scheduling of the packet and queueing placement for the outgoing interface for the packet, and, before the packet is sent out toward the next-hop node, updates the TLB within the packet and then forwards the packet over the outgoing interface for propagation toward the next-hop node.

The network forwarding node 120-1, as indicated above, performs packet scheduling and queuing placement for the packet based on the TLB within the transaction packet when the transaction packet was received. The network forwarding node 120-1 may perform the packet scheduling and queuing placement for the packet, based on the TLB, in various ways. For example, the network forwarding node 120-1 may be configured such that the packet scheduler in front of the output port maintains two queues as follows: a first-in-first-out (FIFO) queue for regular traffic that is not sensitive to transactional latency (e.g., packets that do not have a TLB associated therewith) and a push-in-first-out (PIFO) queue for latency-sensitive traffic that is sensitive to transactional latency (e.g., packets that do have a TLB associated therewith). The ordering of the packets in the PIFO queue may be based on the TLB values of the packets. For example, since a lower TLB value indicates that there is less time remaining in the transaction latency budget for the transaction, a lower TLB value is considered to have a higher priority and, thus, the ordering of the packets in the PIFO queue may be in order of increasing TLB value (i.e., so packets with lower TLB values are selected for transmission with higher priority).

The network forwarding node 120-1, as indicated above, updates the TLB within the packet before forwarding the packet over the outgoing interface for propagation toward the next-hop node. The TLB of the packet may be updated as follows: $TLB_{new}(P)=TLB_{current}(P)-[(t_1(P)-t_0(P))-Prop_n(s)]$, where $TLB_{new}(P)$ is the new TLB that is added to the packet before the packet is sent toward the next-hop node, $TLB_{current}(P)$ is the current amount of transaction latency budget that is being updated based on the delay of the transaction packet within the network forwarding node 120-1 and the delay in propagation of the transaction packet from the network forwarding node 120-1 to the next-hop node, $(t_1(P)-t_0(P))$ is the delay of the transaction packet within the network forwarding node 120-1(*t*)(P) is the local time stamp when the packet is sent out from the network forwarding node 120-1 and to (P) is the local time stamp when the packet was received at the network forwarding node 120-1), and $Prop_n(s)$ is the propagation delay from the local node to the next-hop node (denoted as $Prop_n(1)$ from the network forwarding node 120-1 to the network forwarding node 120-2).

The network forwarding node 120-1 may obtain the propagation delay $Prop_n(s)$, for use in computing the updated TLB for the transaction packets, in various ways. For example, the propagation delay $Prop_n(s)$ may be statically configured on the network forwarding node 120-1, dynamically determined by the network forwarding node 120-1, or the like, as well as various combinations thereof. For example, where the propagation delay $Prop_n(s)$ is statically configured on the network forwarding node 120-1, the propagation delay $Prop_n(s)$ may be determined based on a combination of the network connectivity media used for the link between the network forwarding node 120-1 and the next-hop node (e.g., Ethernet, optical, WiFi, cellular (e.g., 4G, 5G, 6G, or the like), or the like) and a distance between the network forwarding node 120 and the next-hop node. For example, where the propagation delay $Prop_n(s)$ is determined dynamically by the network forwarding node 120-1, the propagation delay $Prop_n(s)$ may be determined based on network path auto-discovery. It will be appreciated that that the selection of the next-hop node and/or updating of the TLB may be impacted by available feedback from the network. It will be appreciated that the propagation delay $Prop_n(s)$ may be determined in other suitable ways.

At step 154, the network forwarding node 120-2 forwards the transaction packets associated with the transaction toward the next node (illustratively, toward the intermediate compute node 110-I for additional computations for the transaction prior to completion of the transaction by the last compute node 110-Z). The network forwarding node 120-2 forwards the individual transaction packets carrying transaction data of the transaction. The handling of the transaction packets of the transaction by the network forwarding node 120-2 may be similar to the handling of the transaction packets of the transaction by the network forwarding node 120-1. The network forwarding node 120-2 sends the transaction packets toward the intermediate compute node 110-I.

At step 155, the intermediate compute node 110-I receives the transaction packets including the transaction data for the transaction and performs transaction handling for the transaction based on the transaction data and the TLBs included within the transaction packets of the transaction. The intermediate compute node 110-I, reassembles the transaction data from the transaction packets, recomputes the remaining transaction TLB from the TLBs of the individual transaction packets, and, assuming that the remaining transaction TLB is sufficient, processes the transaction data and computes the transaction data and remaining TLB to be sent to the last compute node 110-Z. It is noted that priority of transaction processing scheduling, together with the amount of resources (e.g., CPU resources, number of threads for parallel processing, memory resources, and other compute resources) needed for compute processing at the intermediate compute node 110-I is determined using TLB. For example, it can be determined according to reverse order of the recomputed TLB, that is lower TLB yields higher priority and more compute resources and higher TLB yields lower priority and less compute resources. It is noted that dynamic TLB may be used in addition to other (static) considerations (e.g., other dynamic considerations, various static considerations, or the like) to determine priority of scheduling and amount of compute resources for compute processing of the transaction. For example, some static considerations may include statically prioritizing transactions belonging to specific applications, statically allocating preconfigured amounts of compute resources (e.g., amounts of CPU, number of threads for parallel processing, memory, or the like), or the like, as well as various combinations thereof. The handling of transaction packets of the transaction by the intermediate compute node 110-I may be performed as presented in FIG. 2. The intermediate compute node 110-I, if needed, segments the transaction data into individual packets and updates the TLB similarly to the first compute node, and sends the transaction packets toward the network forwarding node 120-3.

At step 156, the network forwarding node 120-3 forwards the transaction packets associated with the transaction toward the next node (illustratively, toward the last compute node 110-Z for completion of the transaction by the last compute node 110-Z). The network forwarding node 120-3 forwards the individual transaction packets carrying transaction data of the transaction. The handling of the transaction packets of the transaction by the network forwarding node 120-3 may be similar to the handling of the transaction packets of the transaction by the network forwarding node 120-1. The network forwarding node 120-3 sends the transaction packets toward the last compute node 110-Z. It is noted that priority of the packet transmission to the last compute node is determined according to reverse order of the TLB(lower TLB yields higher priority and higher TLB yields lower priority).

At step 157, the last compute node 110-Z receives the transaction packets including the transaction data for the transaction and performs transaction handling for the transaction based on the transaction data and the TLBs included within the transaction packets of the transaction. The compute node 110-Z recomputes the transaction TLB from individual TLBs of the packets belonging to the transaction. Assuming that there is sufficient TLB remaining for processing of the transaction, reassembles the transaction data from the transaction packets and processes the transaction data. It is noted that priority of transaction processing scheduling, together with the amount of resources (e.g., CPU resources, number of threads for parallel processing, memory resources, and other compute resources) needed for compute processing at the last compute node 110-Z is determined using TLB. For example, it can be determined according to reverse order of the recomputed TLB, that is lower TLB yields higher priority and more compute resources and higher TLB yields lower priority and less compute resources. It is noted that dynamic TLB may be used in addition to other (static) considerations (e.g., other dynamic considerations, various static considerations, or the like) to determine priority of scheduling and amount of compute resources for compute processing of the transaction. For example, some static considerations may include statically prioritizing transactions belonging to specific applications, statically allocating preconfigured amounts of compute resources (e.g., amounts of CPU, number of threads for parallel processing, memory, or the like), or the like, as well as various combinations thereof. The transaction may be completed on the compute node 110-Z (in which case no further propagation of transaction data from the compute node 110-Z is needed) or the compute node 110-Z may be an intermediate node in the transaction (in which case further propagation of transaction data resulting from processing performed by the compute node 110-Z for the transaction may be performed by the compute node 110-Z, i.e., the compute node 110-Z may perform certain steps described herein as being performed by compute node 110-A at step 151 and 152). The handling of transaction packets of the transaction by the last compute node 110-Z may be performed as presented in FIG. 2.

It will be appreciated that, although primarily presented with respect to a specific arrangement of the transaction processing system 100 (including specific numbers and arrangements of compute nodes 110 and network forwarding nodes 120), the transaction processing system 100 may be arranged in various other ways for handling the described transaction, may be arranged in various other ways for handling various other types of transactions, or the like, as well as various combinations thereof.

FIG. 2 depicts an example embodiment of a method for use by a compute node to support handling of packetized transaction data of a transaction of a transaction-based application or service in a manner for supporting enforcement of end-to-end transaction latency for the transaction of the transaction-based application or service.

It will be appreciated that, although primarily presented as being performed serially, at least a portion of the functions of the method 200 may be performed contemporaneously or in a different order than as presented with respect to FIG. 2.

At block 201, the method 200 begins. It will be appreciated that the method 200 may be triggered to begin when the first packet of a new transaction is received (e.g., based on receipt of a transaction packet including a transaction identifier that has not been seen within a certain length of time).

At block 205, a (next) packet(denoted as packet P) is received. The packet P is a packet of a transaction that is communicated using a set of one or more packets (i.e., the received packet may be the only packet for the transaction or one of multiple packets received for the transaction). The packet P includes a transaction header. The transaction header of the packet includes a transaction identifier of the transaction (denoted as Trans_ID), the transaction latency budget (denoted as TLB(P)), and, optionally (e.g., in the case in which the transaction is transported using multiple packets) the sequence number of packet P (seq_num(P)). The local processing node timestamp of when the packet is received is attached to the packet context. From block 205, the method 200 proceeds to block 210.

At block 210, a number of preliminary processing steps are performed for the received packet P.

The following information is stored for the received packet P for the purpose of recomputing the transaction TLB: (1) the TLB of packet P (TLB(P)), (2) the sequence number of packet P (seq_num (P), and (3) a local timestamp indicative of the time at which the packet P was received (denoted as t(P)).

The packet P is added, in sequence based on the sequence numbers included in the received packets, to any other packets of the transaction that have been received and processed.

The local transaction expiration budget or remaining time until transaction expiration for the transaction identified by Trans_id (denoted as Exp(Trans_Id)) is set (where the packet P is the first packet received for the transaction) or updated (where the packet P is a subsequent packet received for the transaction). The local transaction expiration budget may be computed differently based on whether the packet P is the first packet of the transaction that has been received or a subsequent packet of the transaction that has been received. Where the packet P is the first packet of the transaction that has been received, the local transaction expiration budget Exp(Trans_Id) may be computed as Exp(Trans_Id)=Remain(Trans_id)=TLB(P), where TLB(P) is the TLB received in the packet P header. Where the packet P is a subsequent packet of the transaction that has been received, the local transaction expiration budget Exp(Trans_Id) may be computed as Exp(Trans_Id)=Remain(Trans_id)=min (TLB(P), Remain(Trans_id)−(t(P)−$t_{last}$)), which is computed as a minimum of (1) the transaction latency budget extracted from the header of the packet P (denoted as TLB(P)) and (2) a difference between Remain(Trans_id) computed when the previous packet of this transaction was received and the time elapsed since the previous packet of this transaction was received (which is represented by (t(P)−$t_{last}$), where t(P) is the local timestamp indicative of the time at which the packet P was received and $t_{last}$ is the local timestamp indicative of the time at which previous packet of this transaction was received. As may be seen from the equation, the Exp(Trans_ID) for the first packet of the transaction that is received is simply set equal to TLB(P). It will be appreciated that the remaining pending transaction time is recomputed on every transaction packet that is received. From block 210, the method 200 proceeds to block 215.

At block 215, a determination is made as to whether complete transaction data for the transaction has been received. In other words, a determination is made as to whether all packets transporting transaction data for the transaction have been received. This may be determined from information in the transaction headers of the packets. For example, this may be determined by comparing a count of the number of packets received to the total number of packets for the transaction extracted from the transaction header(s) of the packet(s), based on sequence numbers in the packets that have been received, or the like, as well as various combinations thereof. If the complete transaction data for the transaction has been received, then the method 200 proceeds to block 235. If the complete transaction data for the transaction data has not been received, then the method 200 proceeds to block 220.

At block 220, a determination is made as to whether the pending transaction has expired. Here, it is considered a pending transaction because not all of the transaction data of the transaction has been received. If the pending transaction has expired then there is no need to continue waiting for remaining packets of the transaction and the transaction can be discarded. The determination as to whether the pending transaction has expired may be based on the remaining transaction time computed at block 215. The determination as to whether the pending transaction has expired may be a determination as to whether the remaining transaction time is less than some predetermined threshold indicative of a length of time under which it may be assumed that there is no chance that the transaction operations for the transaction can be completed. The predetermined threshold may be set a theoretical limit (e.g., a threshold of zero since) or a more practical limit (e.g., a relatively low value under which it is known or may be safely assumed that there is no chance that the transaction operations for the transaction can be completed). The predetermined threshold may be statically configured based on experimental data for timestamping remaining transaction operations (which may be based on various inputs, such as operation types of the transaction operations, a transaction type of the transaction, or the like, as well as various combinations thereof). If the pending transaction is determined not to have expired, then the method 200 proceeds to block 230. If the pending transaction is determined to have expired, then the method 200 proceeds to block 225, from which the method 200 proceeds to block 299 where the method 200 ends.

At block 225, the transaction is discarded. The transaction is discarded based on determination that the transaction expired. The transaction may be discarded by deleting each of the packets of the transaction that have been received, marking for deletion each of the packets of the transaction that have been received, or the like. From block 225, the method 200 proceeds to block 299 where the method 200 ends. It is noted that, when the transaction is discarded, a notification may be sent to transaction originating node.

At block 230, the node continues to wait for the next packet of the transaction. The node cannot proceed with processing of the transaction until each of the packets of the transaction has been received. From block 230, the method 200 returns to block 205, at which point the next packet of the transaction is received (and the method again proceeds through blocks 215 and 220 for the newly received packet of the transaction).

At block 235, the transaction latency budget of the packet P is updated. The TLB is set to the remaining TLB from block 210 (i.e., to the Remain(Trans_id) that remains after the last packet of the transaction has been received and the transaction has been reassembled). In other words, $TLB_{last}$=Remain(Trans_id). Additionally, a local timestamp of when TLB was last updated, denoted as $t_{last\_TLB\_update}$, is attached to the transaction for use in computing the local processing delay associated with local processing of the transaction. From block 235, the method 200 proceeds to block 240.

At block 240, a determination is made as to whether the complete transaction has expired. Here, it is considered a complete transaction because all of the transaction data of the transaction has been received. If the complete transaction has expired then there is no need to continue processing the packets of the transaction and the transaction can be discarded. The determination as to whether the complete transaction has expired may be based on the remaining transaction time computed at block 215. The determination as to whether the complete transaction has expired may be a determination as to whether the remaining transaction time is less than some predetermined threshold indicative of a length of time under which it may be assumed that there is no chance that the transaction operations for the transaction can be completed. The predetermined threshold may be set a theoretical limit (e.g., a threshold of zero since) or a more practical limit (e.g., a relatively low value under which it is known or may be safely assumed that there is no chance that the transaction operations for the transaction can be completed). The predetermined threshold may be statically configured based on experimental data for timestamping remaining transaction operations (which may be based on various inputs, such as operation types of the transaction operations, a transaction type of the transaction, or the like, as well as various combinations thereof). If the complete transaction is determined not to have expired, then the method 200 proceeds to block 245. If the complete transaction is determined to have expired, then the method 200 proceeds to block 225, from which the method 200 proceeds to block 299 where the method 200 ends.

At block 245, the computation of scheduling priority of the compute job for the transaction is performed together with the computation of the amount of compute resources allocated to perform the transaction. An example of using different priorities for transaction compute processing is as follows. The compute job scheduler may maintain two queues of scheduled compute processing tasks: a best effort queue for regular compute tasks that are not sensitive to transactional latency (e.g., tasks that do not have a TLB associated therewith) and a priority queue for compute tasks that are sensitive to transactional latency (e.g., tasks that do have a TLB associated therewith). The ordering of the compute tasks in the priority queue may be based on the TLB values of the compute tasks. For example, since a lower TLB value indicates that there is less time remaining in the transaction latency budget for the transaction, a lower TLB value is considered to have a higher priority and, thus, the ordering of the compute tasks in the priority queue may be in order of increasing TLB value (i.e., so that compute tasks with lower TLB values are handled with higher priority). The compute scheduler, when scheduling compute tasks, also may assign adequate compute resources (e.g., central processing units (CPUs), random access memory (RAM), cache memory, threads, or the like, as well as various combinations thereof) to ensure timely execution of the compute tasks. For example, the amount of compute resources may include the number of dedicated CPUs, the amount of Random Access Memory (RAM), the amount of dedicated hardware cache (e.g., L1, L2, L3, L4, or the like) if it can be partitioned and shared, the number of threads for parallel computations, rules and priorities of thread preemption and context switching when the same CPU is shared for processing of multiple compute tasks and transactions, or the like, as well as various combinations thereof. The compute resources information indicative of the compute resources assigned for a given compute task may be obtained from various sources of such information (e.g., from the transaction data of the transaction where the transaction data specifies the compute resources needed for the transaction, via configuration, or the like, as well as various combinations thereof). For example, the amount of CPU, memory, and other compute resources needed for the next compute job may be determined according to reverse order of the recomputed TLB(lower TLB yields higher priority and more compute resources). From block 245, the method 200 proceeds to block 250.

At block 250, the compute job for the transaction is processed and the TLB for the transaction is updated to account for the processing time. The TLB for the transaction may be updated by subtracting the difference between the local time at which processing of the compute job for the transaction is completed (denoted as local_time) and the local timestamp corresponding to the time at which the last the TLB update was performed (denoted as $t_{last\_TLB\_update}$, which corresponds to the time at which the TLB update was performed at block 235). For example, the TLB for the transaction may be updated as follows: $TLB_{new}=TLB_{last}-(local\_time-t_{last\_TLB_{update}})$. This accounts for the delay between the time at which the decision to begin processing the current compute job for the transaction was made (which, for the first local compute job for the transaction, also corresponds to the time at which the decision to begin processing the transaction was made) and the time when processing of the current compute job for the transaction was completed.

At block 255, a determination is made as to whether the transaction is complete or whether additional compute jobs (on this compute node and/or other compute nodes) are needed to complete the transaction. If the transaction is complete, then the method 200 proceeds to block 299 where the method 200 ends. If the transaction is not complete, then the method 200 proceeds to block 260.

At block 260, a determination is made as to whether the next compute job for the transaction is local. If the next compute job for the transaction is local, then the method 200 returns to block 240 for handling of the next compute job for the transaction locally at the compute node. If the next compute job for the transaction is not local, then the method 200 proceeds to block 265.

At block 265, transaction output data is sent toward a next compute node for the transaction. The transaction output data may be sent toward the next compute node for the transaction by passing the transaction output data to a local network stack for sending of the transaction output data toward the next compute node using a set of packets including transaction headers (e.g., including the transaction identifier, updated TLB, and so forth). The priority of scheduling the sending of the packets for the transaction toward the next compute node by the local network stack may be determined according to reverse order of the recomputed TLB(lower TLB yields higher priority and more compute resources). The priority of scheduling the sending of the packets for the transaction also may be based on other considerations, which may include other dynamic considerations, various static considerations (e.g., preconfigured knowledge of the number of network hops to the next compute node), or the like, as well as various combinations thereof. The TLB of each packet may be further updated at the time of sending the packet out by subtracting the time elapsed from completion of the last compute job. From block 265, the method 200 proceeds to block 299 where the method 200 ends.

At block 299, the method 200 ends.

As described herein, enforcement of end-to-end transaction latency for transaction-based applications or services may be provided for various types of transaction-based applications or services which may be implemented within various transaction-based application and service contexts. For example, transaction-based applications or services may be configured to provide mission critical capabilities, automation capabilities (e.g., industrial automation, factory automation, autonomous mining, autonomous vehicles, or the like), extended reality (XR) capabilities (e.g., virtual reality (VR), augmented reality (AR), mixed reality (MR), or the like), health-related capabilities, gaming capabilities, or the like, as well as various combinations thereof. For example, transaction-based applications or services may be provided within network provider contexts, cloud network contexts, data center contexts, enterprise network contexts, or the like, as well as various combinations thereof. It will be appreciated that enforcement of end-to-end transaction latency for various types of transaction-based applications or services which may be implemented within various contexts may be further understood by considering enforcement of end-to-end transaction latency for specific transaction-based applications or services.

For example, a first example of a transaction is a virtual reality Live 360 view application. Here, a single transaction consists of: (1) application client receives and processes touch screen or sensor movement input from the user; (2) application client encodes the movement input and sends the encoded movement input over a network to a cloud server; (3) cloud server uses the movement input to determine the angle of view, zoom level, and additional objects to be encoded, and encodes a video frame combining all the inputs; (4) cloud server sends the encoded video frame to the application client; and (5) application client renders the received video frame. The transactional latency budget for this transaction depends on the number of video frames per second. For example, with 30 frames per second the budget is 1 sec/30=33 milliseconds, with 60 frames-per-second the budget is ~16.5 milliseconds, with 90 frames-per-second the transaction latency budget is ~11.9 milliseconds, and so forth. Various example embodiments presented herein may be applied to this type of transaction-based application/service in order to support enforcement of end-to-end transaction latency for the transaction of the transaction-based application or service.

For example, a second example of a transaction for which end-to-end transaction latency may be provided is a single cloud control loop transaction within a cloud-based control loop. Here, a single transaction consists of: (1) end device(s) sensor(s) collecting measurements and assembling a measurement report(s); (2) end device(s) sensor(s) sending the measurement report(s) to the an edge cloud controller over a network; (3) edge cloud controller processing inputs from sensors and computing an operational action(s) (4) edge cloud controller sending an action command(s) to a processor/actuator; and (5) processor/actuator executing the received action command. The transactional latency budget is application dependent and may vary from single milliseconds to tens or hundreds of milliseconds. Various example embodiments presented herein may be applied to this type of transaction-based application/service in order to support enforcement of end-to-end transaction latency for the transaction of the transaction-based application or service.

For example, a third example of a transaction for which end-to-end transaction latency may be provided is an interactive multi-user virtual reality application where each individual user is represented by an avatar and can at any time see only part of the large action map (in the vicinity of the current position of the user on the map) together with position, actions, and movements of other users, including real time interactions with the environment and other users. For example, the transaction may include the following operations. In a first operation, the user performs an individual action (on a touch screen or using virtual reality goggles and controls) on an end device which indicates the requested user action. For example this action may be user avatar movement together with a specific action to perform interaction with a virtual environment (e.g., lift or zoom into a virtual environment object, analyze the object state, control operation of a virtual environment object, or the like), or specific action to perform interaction with the avatar(s) of one or more other users (e.g. collaboratively working on a virtual environment object, fighting, or the like). In a second operation, the requested user action together with environment state is processed and encoded locally into a message and communicated to the cloud server over a communication network. Transaction related compute on this first node may be performed to collect the user action and environment state via device sensors (e.g., touch screen, virtual reality headset and controllers movement sensors, eye and body tracking sensors, temperature and video analysis camera sensors, etc.), and encode into transaction data in digital format. This transaction data is then communicated to the virtual reality application cloud server over the network, the server being an intermediate compute node for the transaction. In a third operation, the application cloud server processes the received transaction information from a multitude of end devices of a multitude of users, computes for each user the respective individual states representing the avatar position of the user on the map, state of the avatar representing snapshot of the action that avatar of the user is performing (e.g. arms outstretched, one leg in front of the other, head turned, etc.), computes new state of the environment as a result of actions of this user and other users in the vicinity, computes states of the other users in the vicinity of the user, and encodes this information into processed transaction data in digital format. The application cloud server then sends the encoded processed transaction data back to the corresponding end device to be rendered for the user (the end device is also the last compute node in the transaction). In a fourth operation, the end device (which is the end compute node in this example) receives the encoded by the cloud server processed transaction data and renders it for the user (e.g. via touch screen or visualization of sensory inputs in virtual reality goggles), which concludes the transaction. Various example embodiments presented herein may be applied to this type of transaction-based application/service in order to support enforcement of end-to-end transaction latency for the transaction of the transaction-based application or service.

It will be appreciated that enforcement of end-to-end transaction latency for various types of transaction-based applications or services which may be implemented within various contexts, such as those example discussed above as well as various other transaction-based applications or services which may be implemented within other various contexts, may be further understood by considering enforcement of end-to-end transaction latency for specific transaction-based applications or services which may be implemented within specific contexts, an example of which is presented with respect to FIG. 3.

FIG. 3 depicts an example embodiment of a transaction processing system supporting a specific transaction-based application, a cloud control service, for illustrating enforcement of end-to-end transaction latency for the transaction-based application.

The transaction processing system 300 is configured to provide a cloud control service in the form of an edge cloud assisted control loop which may be used for control of a device from a network cloud based application controller. The cloud control service may be used for various transaction-based applications, such as cloud generated images application services, cloud-based industrial control applications, or the like. The cloud control service utilizes a sensor 310, a controller/actuator 320, and a process 330, where the sensor 310, the controller/actuator 320, and the process 330 may cooperate to complete transactions of the cloud control service 300. The total end-to-end transaction latency for a transaction, denoted as T, includes a combination of compute latency and network forwarding latency required for completion of the transaction. More specifically, the total end-to-end transaction latency T for a transaction includes a compute latency TO (processing latency at the sensor 310 for taking sensor measurements and preparing reports), a network latency T1 (network latency for sending measurement reports from the sensor 310 to the actuator/controller 320), a compute latency T2 (processing latency at the controller/actuator 320, in an edge cloud, for processing measured output from the sensor 310 to determine operational actions to achieve desired output response), a network latency T3 (network latency for sending transaction control/data information from the controller/actuator 320 to the process 330), and a compute latency T4 (processing latency at the process 330 processing the transaction control/data information from the controller actuator 320 to provide an output that completes the transaction). It will be appreciated that the transaction supported by the transaction processing system 300 is an example of a transaction involving sequential processing of data at multiple compute nodes and passing data via multiple network forwarding nodes.

The transaction processing system 300 is configured to support enforcement of the total end-to-end transaction latency for a transaction, which as indicated above is T=T0+T1+T2+T3+T4 for the cloud control service, in a manner that enables dynamic apportioning of the total end-to-end transaction latency to various portions of compute latency and/or network latency according to the real-time conditions of the transaction processing system 300. The transaction processing system 300 is configured to support enforcement of the total end-to-end transaction latency by associating with the transaction a transaction latency budget that is indicative of a length of time remaining for completion of the transaction where the transaction latency budget may be updated along the end-to-end path of the transaction based on the length of time elapsed since the transaction was initiated (e.g., the transaction latency budget of the transaction is initialized to the total end-to-end transaction latency T and then updated at each hop of the end-to-end path of the transaction based on the length of time elapsed at each hop of the end-to-end path of the transaction), thereby enabling the total end-to-end transaction latency T to be apportioned to the constituent portions of the end-to-end path of the transaction without the need to allocate specific portions of the total end-to-end transaction latency T for specific compute functions or network forwarding functions). In other words, enforcement of the total end-to-end transaction latency for a transaction of a transaction-based application or service, by associating with the transaction of the transaction-based application or service the transaction latency budget indicative of the length of time remaining for completion of the transaction of the transaction-based application or service, provides significant improvements in enforcement of the total end-to-end transaction latency for the transaction of the transaction-based application or service.

Figure 6:
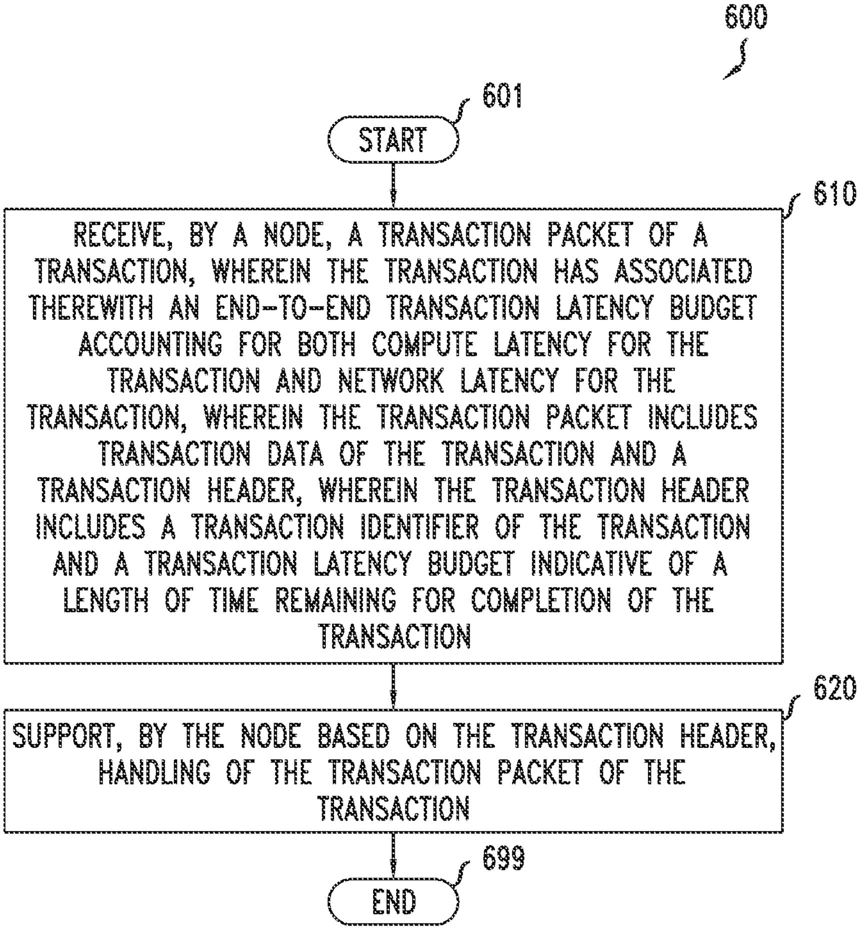
FIG. 6 depicts an example embodiment of a method for use by a compute node that supports processing of a transaction of a transaction-based application or service to support enforcement of end-to-end transaction latency for the transaction of the transaction-based application or service.

It will be appreciated that enforcement of end-to-end transaction latency for various types of transaction-based applications or services which may be implemented within various contexts may be further understood by considering various aspects of functions performed by specific types of nodes which may be involved with handling of various types of transaction-based applications or services which may be implemented within various contexts, such as compute nodes which initiate transactions (example embodiments of which are discussed with respect to FIG. 4), network nodes which handle network delivery of transaction packets of transactions between compute nodes (example embodiments of which are discussed with respect to FIG. 5), compute nodes which perform processing functions for transactions including intermediate processing functions and transaction completion functions example embodiments of which are discussed with respect to FIG. 6), and so forth.

Figure 4:
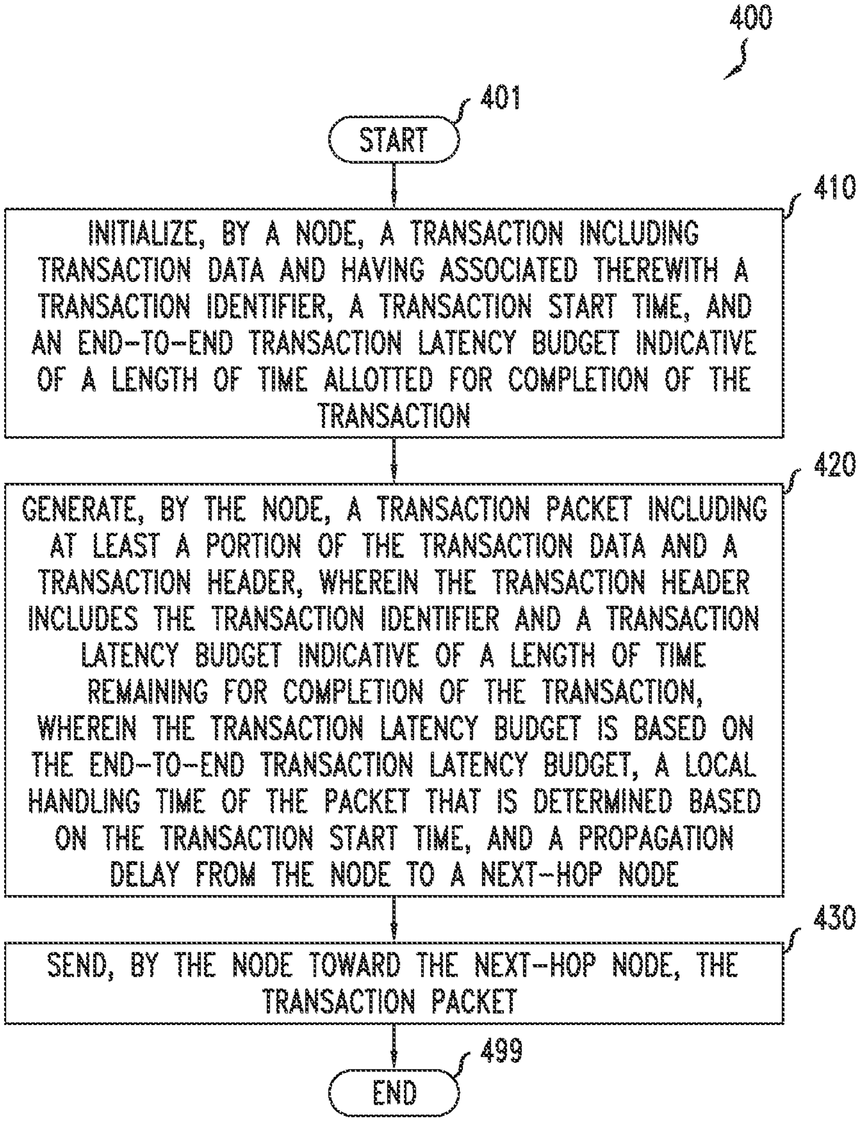
FIG. 4 depicts an example embodiment of a method for use by a compute node that initializes a transaction of a transaction-based application or service to support enforcement of end-to-end transaction latency for the transaction of the transaction-based application or service.

FIG. 4 depicts an example embodiment of a method for use by a compute node that initializes a transaction of a transaction-based application or service to support enforcement of end-to-end transaction latency for the transaction of the transaction-based application or service. It will be appreciated that, although primarily presented as being performed serially, at least a portion of the functions of the method 400 may be performed contemporaneously or in a different order than as presented with respect to FIG. 4. At block 401, the method 400 begins. At block 410, initialize, by a node, a transaction including transaction data and having associated therewith a transaction identifier, a transaction start time, and an end-to-end transaction latency budget indicative of a length of time allotted for completion of the transaction. At block 420, generate, by the node, a transaction packet including at least a portion of the transaction data and a transaction header, wherein the transaction header includes the transaction identifier and a transaction latency budget indicative of a length of time remaining for completion of the transaction, wherein the transaction latency budget is based on the end-to-end transaction latency budget, a local handling time of the packet that is determined based on the transaction start time, and a propagation delay from the node to a next-hop node. At block 430, send, by the node toward the next-hop node, the transaction packet. At block 499, the method 400 ends. It will be appreciated that, although primarily presented with respect to example embodiments in which the transaction data of a transaction is transported by a single packet, in at least some example embodiments the transaction data of the transaction will be segmented into multiple packets including respective portions of the transaction data and respective transaction headers including the transaction latency budget It will be appreciated that various functions presented herein with respect to FIGS. 1-2 may be incorporated within the context of method 400 of FIG. 4.

FIG. 5 depicts an example embodiment of a method for use by a network forwarding node for handling a transaction packet of a transaction of a transaction-based application or service in a manner for supporting enforcement of end-to-end transaction latency for the transaction of the transaction-based application or service. It will be appreciated that, although primarily presented as being performed serially, at least a portion of the functions of the method 500 may be performed contemporaneously or in a different order than as presented with respect to FIG. 5. At block 501, the method 500 begins. At block 510, receive, by a node, a transaction packet associated with a transaction, wherein the transaction packet includes a transaction header and transaction data for the transaction, wherein the transaction header includes a transaction latency budget indicative of a length of time remaining for completion of the transaction. At block 520, determine, by the node, an outgoing interface toward a next-hop node for the transaction packet. At block 530, determine, by the node based on the transaction latency budget, scheduling of the transaction packet for transmission via the outgoing interface toward the next-hop node. At block 540, update, by the node, the transaction latency budget in the transaction header of the transaction packet. At block 550, send, by the node toward the next-hop node via the outgoing interface toward the next-hop node, the transaction packet. At block 599, the method 500 ends. It will be appreciated that various functions presented herein with respect to FIGS. 1-2 may be incorporated within the context of method 500 of FIG. 5.

FIG. 6 depicts an example embodiment of a method for use by a compute node that supports processing of a transaction of a transaction-based application or service to support enforcement of end-to-end transaction latency for the transaction of the transaction-based application or service. It will be appreciated that, although primarily presented as being performed serially, at least a portion of the functions of the method 600 may be performed contemporaneously or in a different order than as presented with respect to FIG. 6. At block 601, the method 600 begins. At block 610, receive, by a node, a transaction packet of a transaction, wherein the transaction has associated therewith an end-to-end transaction latency budget accounting for both compute latency for the transaction and network latency for the transaction, wherein the transaction packet includes transaction data of the transaction and a transaction header, wherein the transaction header includes a transaction identifier of the transaction and a transaction latency budget indicative of a length of time remaining for completion of the transaction. At block 620, support, by the node based on the transaction header, handling of the transaction packet of the transaction. At block 699, the method 600 ends. It will be appreciated that various functions presented herein with respect to FIGS. 1-2 may be incorporated within the context of method 600 of FIG. 6.

FIG. 7 depicts an example embodiment of a method for use by a node to support enforcement of end-to-end transaction latency for a transaction of a transaction-based application or service. It will be appreciated that, although primarily presented as being performed serially, at least a portion of the functions of the method 700 may be performed contemporaneously or in a different order than as presented with respect to FIG. 7. At block 701, the method 700 begins. At block 710, receive a set of transaction packets associated with a transaction, wherein the transaction packets include respective portions of transaction data of the transaction and respective transaction latency budgets for the respective packets. At block 720, compute, based on the transaction latency budgets for the respective packets and information indicative of delays associated with receipt of the set of transaction packets, a first updated transaction latency budget for the transaction. At block 730, compute, based on the first updated transaction latency budget for the transaction, a scheduling priority for processing of the transaction data and an amount of compute resources for processing of the transaction data. At block 740, process, based on the scheduling priority and the amount of compute resources, the transaction data of the transaction to produce updated transaction data of the transaction. At block 750, compute, based on the first updated transaction latency budget for the transaction and information indicative of delays associated with processing of the transaction data of the transaction to produce the updated transaction data of the transaction, a second updated transaction latency budget for the transaction. At block 760, segment the new transaction data into a set of new transaction packets associated with the transaction, wherein the new transaction packets include respective portions of the updated transaction data of the transaction and the second updated transaction latency budget for the transaction. At block 770, schedule, based on the second updated transaction latency budget for the transaction, sending of the new transaction packets. At block 780, compute, based on the second updated transaction latency budget for the transaction and information indicative of delays associated with sending of the new transaction packets, respective new transaction latency budgets for the new packets. At block 790, send the new transaction packets associated with the transaction, wherein the new transaction packets include respective portions of the updated transaction data of the transaction and the respective new transaction latency budgets for the new packets. At block 799, the method 700 ends. It will be appreciated that various functions presented herein with respect to FIGS. 1-2 may be incorporated within the context of method 700 of FIG. 7.

FIG. 8 depicts an example embodiment of a method for use by a node to support enforcement of end-to-end transaction latency for a transaction of a transaction-based application or service. It will be appreciated that, although primarily presented as being performed serially, at least a portion of the functions of the method 800 may be performed contemporaneously or in a different order than as presented with respect to FIG. 8. At block 801, the method 800 begins. At block 810, support, by a node, communication of a packet including transaction data of a transaction, wherein the transaction has associated therewith an end-to-end transaction latency budget accounting for both compute latency for the transaction and network latency for the transaction, wherein the packet includes an indication of a transaction latency budget remaining for completion of the transaction. At block 820, support, by the node based on the transaction latency budget remaining for completion of the transaction, handling of the packet at the node. At block 899, the method 800 ends. It will be appreciated that various functions presented herein with respect to FIGS. 1-2 may be incorporated within the context of method 800 of FIG. 8.

Various example embodiments for supporting enforcement of end-to-end transaction latency for transaction-based applications and services may provide various advantages for potential advantages. For example, various example embodiments for supporting enforcement of end-to-end transaction latency for transaction-based applications and services may be configured to enforce end-to-end transaction latency that accounts for both compute latency and network latency. For example, various example embodiments for supporting enforcement of end-to-end transaction latency for transaction-based applications and services may be configured to enforce end-to-end transaction latency without the need for use of network-wide time synchronization (rather, all of the timing may be measured locally using local clocks of the elements in the end-to-end path of the application or service transaction). It will be appreciated that various example embodiments for supporting enforcement of end-to-end transaction latency for transaction-based applications and services may provide various other advantages for potential advantages.

Figure 9:
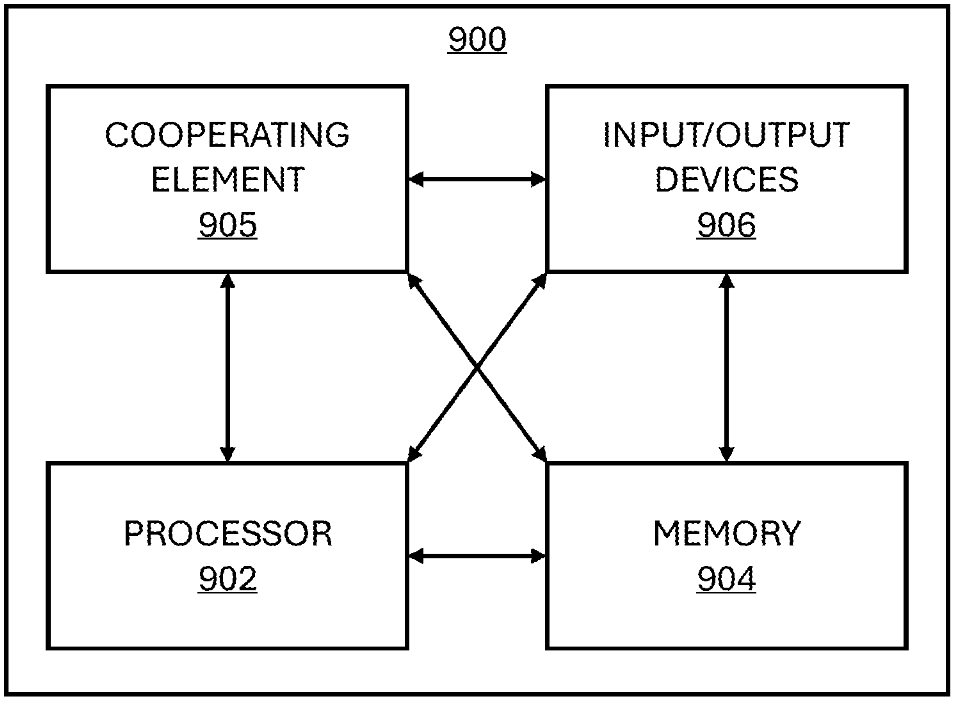
FIG. 9 depicts an example embodiment of a computer suitable for use in performing various functions presented herein.
Figure 10:
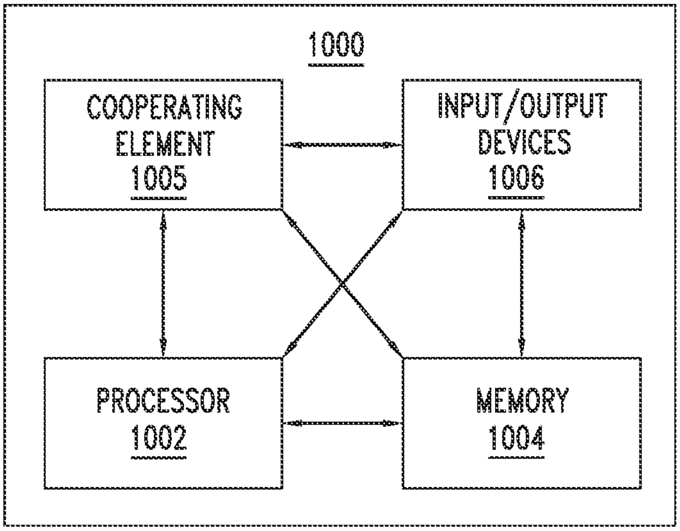

FIG. 9 depicts an example embodiment of a computer suitable for use in performing various functions presented herein.

The computer 900 includes a processor 902 (e.g., a central processing unit (CPU), a processor, a processor having a set of processor cores, a processor core of a processor, or the like) and a memory 904 (e.g., a random access memory (RAM), a read-only memory (ROM), or the like). In at least some example embodiments, the computer 900 may include at least one processor and at least one memory storing instructions which, when executed by the at least one processor, cause the computer 900 to perform various functions presented herein.

The computer 900 also may include a cooperating element 905. The cooperating element 905 may be a hardware device. The cooperating element 905 may be a process that can be loaded into the memory 904 and executed by the processor 902 to implement various functions presented herein (in which case, for example, the cooperating element 905 (including associated data structures) can be stored on a non-transitory computer readable medium, such as a storage device or other suitable type of storage element (e.g., a magnetic drive, an optical drive, or the like)).

The computer 900 also may include one or more input/output devices 906. The input/output devices 906 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 900 may represent a general architecture and functionality suitable for implementing functional elements described herein, portions of functional elements described herein, or the like, as well as various combinations thereof. For example, the computer 900 may provide a general architecture and functionality that is suitable for implementing one or more elements presented herein. For example, the computer 900 may provide a general architecture and functionality that is suitable for implementing at least one of a compute node configured to support enforcement of end-to-end transaction latency for transaction-based applications and services, a portion of a compute node configured to support enforcement of end-to-end transaction latency for transaction-based applications and services (e.g., an application function, a network stack, or the like, as well as various combinations thereof), a network forwarding node configured to support enforcement of end-to-end transaction latency for transaction-based applications and services, a portion of a network forwarding node configured to support enforcement of end-to-end transaction latency for transaction-based applications and services (e.g., an application function, a network stack, or the like, as well as various combinations thereof), or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:

at least one processor; and at least one memory storing instructions which, when executed by the at least one processor, cause the apparatus at least to:

initialize, by a node, a transaction including transaction data and having associated therewith a transaction identifier, a transaction start time, and an end-to-end transaction latency budget indicative of a length of time allotted for completion of the transaction;

generate, by the node, a transaction packet including at least a portion of the transaction data and a transaction header, wherein the transaction header includes the transaction identifier and a transaction latency budget indicative of a length of time remaining for completion of the transaction, wherein the transaction latency budget is based on the end-to-end transaction latency budget, a local handling time of the transaction packet that is determined based on the transaction start time at the node, and a propagation delay from the node to a next-hop node; and send, by the node toward the next-hop node, the transaction packet;

wherein the local handling time of the transaction packet at the node is computed by the node based on a difference between the transaction start time and a local time of successfully sending the transaction packet from the node toward the next-hop node.

2. The apparatus of claim 1, wherein the end-to-end transaction latency budget is selected based on an application with which the transaction is associated.

3. The apparatus of claim 1, wherein the instructions, when executed by the at least one processor, cause the apparatus at least to:

determine, by the node, the propagation delay from the node to the next-hop node, wherein the propagation delay from the node to the next-hop node is based on at least one of a network connectivity media type between the node and the next-hop node, a geographic distance between the node and the next-hop node, a configuration of connectivity between the node and the next-hop node, or a network path autodiscovery capability.

4. The apparatus of claim 1, wherein the instructions, when executed by the at least one processor, cause the apparatus at least to:

compute, by the node, the transaction latency budget by subtracting, from the end-to-end transaction latency budget, the local handling time of the transaction packet at the node and the propagation delay from the node to the next-hop node.

5. The apparatus of claim 1, wherein the transaction packet is one packet in a set of multiple transaction packets including the transaction data of the transaction, wherein the transaction header further includes at least one of a packet sequence number of the transaction packet or a total number of packets in the set of multiple transaction packets including the transaction data of the transaction.

6. The apparatus of claim 1, wherein the transaction is initialized by an application function of the node, wherein the transaction packet is generated and sent by a network function of the node.

7. An apparatus, comprising:

at least one processor; and at least one memory storing instructions which, when executed by the at least one processor, cause the apparatus at least to:

receive, by a node, a transaction packet associated with a transaction, wherein the transaction packet includes a transaction header and transaction data for the transaction, wherein the transaction header includes a transaction latency budget indicative of a length of time remaining for completion of the transaction;

determine, by the node, an outgoing interface toward a next-hop node for the transaction packet;

determine, by the node based on the transaction latency budget, scheduling of the transaction packet for transmission via the outgoing interface toward the next-hop node;

update, by the node, the transaction latency budget in the transaction header of the transaction packet, wherein the transaction latency budget is updated to remove a local handling time of the transaction packet at the node, wherein the local handling time of the transaction packet at the node is computed by the node based on a difference between a time at which the transaction packet was received at the node and a time at which the transaction packet is sent by the node toward the next-hop node; and send, by the node toward the next-hop node via the outgoing interface toward the next-hop node, the transaction packet.

8. The apparatus of claim 7, wherein the transaction latency budget in the transaction header of the transaction packet is updated to remove a length of time between a time at which the transaction packet is received by the node and a time at which the packet is sent by the node and is updated to remove a propagation delay between the node and the next-hop node.

9. The apparatus of claim 7, wherein, to determine the scheduling of the transaction packet for transmission via the outgoing interface, the instructions, when executed by the at least one processor, cause the apparatus to:

queue, by the node using a packet scheduler associated with the outgoing interface toward the next-hop node based on the transaction latency budget included in the transaction packet when the transaction packet was received, the transaction packet in a push-in-first-out queue ordered based on an increasing order of transaction latency budget values.

10. An apparatus, comprising:

at least one processor; and at least one memory storing instructions which, when executed by the at least one processor, cause the apparatus at least to:

receive a set of transaction packets associated with a transaction, wherein the transaction packets include respective portions of transaction data of the transaction and respective transaction latency budgets for the respective packets;

compute, based on the transaction latency budgets for the respective packets and information indicative of delays associated with receipt of the set of transaction packets, a first updated transaction latency budget for the transaction;

compute, based on the first updated transaction latency budget for the transaction, a scheduling priority for processing of the transaction data and an amount of compute resources for processing of the transaction data;

process, based on the scheduling priority and the amount of compute resources, the transaction data of the transaction to produce updated transaction data of the transaction;

compute, based on the first updated transaction latency budget for the transaction and information indicative of delays associated with processing of the transaction data of the transaction to produce the updated transaction data of the transaction, a second updated transaction latency budget for the transaction;

segment the new transaction data into a set of new transaction packets associated with the transaction, wherein the new transaction packets include respective portions of the updated transaction data of the transaction and the second updated transaction latency budget for the transaction;

schedule, based on the second updated transaction latency budget for the transaction, sending of the new transaction packets;

compute, based on the second updated transaction latency budget for the transaction and information indicative of delays associated with sending of the new transaction packets, respective new transaction latency budgets for the new packets; and send the new transaction packets associated with the transaction, wherein the new transaction packets include respective portions of the updated transaction data of the transaction and the respective new transaction latency budgets for the new packets.

11. The apparatus of claim 10, wherein, to compute the first updated transaction latency budget for the transaction, the instructions, when executed by the at least one processor, cause the apparatus at least to:

determine, for the transaction packets, respective timestamps indicative of local times of receipt of the respective transaction packets;

compute, for each of the transaction packets in an order in which the transaction packets are received, a respective remaining transaction latency budget by selecting a minimum of (1) the respective transaction latency budget for the respective packet and (2) a difference between the respective remaining transaction latency budget computed for the previously received transaction packet and a difference between the respective timestamp of the respective transaction packet and the respective timestamp of the previously received transaction packet; and select, as the first updated transaction latency budget for the transaction, the respective remaining transaction latency budget computed for the last of the transaction packets that is received.

12. The apparatus of claim 10, wherein the scheduling priority is inversely related to the first updated transaction latency budget for the transaction.

13. The apparatus of claim 10, wherein the scheduling priority is further based on an estimate of an amount of transaction processing to be performed for processing of the transaction data.

14. The apparatus of claim 10, wherein the amount of compute resources is inversely related to the first updated transaction latency budget for the transaction.

15. The apparatus of claim 10, wherein, to compute the second updated transaction latency budget for the transaction, the instructions, when executed by the at least one processor, cause the apparatus at least to:

determine a processing delay as a difference between a time at which processing of the transaction data began and a time at which processing of the transaction data ended; and compute the updated transaction latency budget for the transaction by subtracting the processing delay from the first updated transaction latency budget for the transaction.

16. The apparatus of claim 10, wherein the processing of the transaction data of the transaction to produce the updated transaction data of the transaction is performed across multiple compute jobs, wherein the second updated transaction latency budget for the transaction is computed by updating transaction latency budget values for each of the multiple compute jobs.

17. The apparatus of claim 10, wherein the scheduling priority for scheduling sending of the new transaction packets is inversely related to the second updated transaction latency budget for the transaction.

* * * * *